(12) United States Patent
Pfaendner et al.

(10) Patent No.: US 11,760,865 B2
(45) Date of Patent: Sep. 19, 2023

(54) HALOGEN-FREE SULPHONIC ACID ESTER AND/OR SULPHINIC ACID ESTER AS FLAME RETARDANT, FLAME RETARDANT SYNERGISTS AND RADICAL GENERATORS IN PLASTICS

(71) Applicant: FRAUNHOFER-GESELLSCHAFT ZUR FÖRDERUNG DER ANGEWANDTEN FORSCHUNG E. V., Munich (DE)

(72) Inventors: Rudolf Pfaendner, Rimbach (DE); Thomas Driever, Odenbach (DE); Anina Leipold, Nidderau (DE); Elke Metzsch-Zilligen, Steffeln (DE)

(73) Assignee: Fraunhofer-Gesellschaft zur förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/633,645

(22) PCT Filed: Jul. 25, 2018

(86) PCT No.: PCT/EP2018/070197
§ 371 (c)(1),
(2) Date: Jan. 24, 2020

(87) PCT Pub. No.: WO2019/020699
PCT Pub. Date: Jan. 31, 2019

(65) Prior Publication Data
US 2020/0231783 A1    Jul. 23, 2020

(30) Foreign Application Priority Data
Jul. 25, 2017  (DE) .................. 10 2017 212 772.4

(51) Int. Cl.
| | |
|---|---|
| C08K 5/42 | (2006.01) |
| C09K 21/10 | (2006.01) |
| C08K 5/43 | (2006.01) |
| C08K 5/00 | (2006.01) |
| C08K 5/41 | (2006.01) |
| C08K 3/016 | (2018.01) |

(52) U.S. Cl.
CPC .............. C08K 5/42 (2013.01); C08K 3/016 (2018.01); C08K 5/0066 (2013.01); C08K 5/41 (2013.01); C08K 5/43 (2013.01); C09K 21/10 (2013.01)

(58) Field of Classification Search
CPC ... C08K 5/32; C08K 5/33; C08K 5/41; C08K 5/42; C08K 5/3415; C08K 5/3417; C08L 23/00; C07C 309/24; C07C 313/04; C07D 209/48
See application file for complete search history.

(56) References Cited

U.S. PATENT DOCUMENTS

| | | | |
|---|---|---|---|
| 2,682,522 A | 6/1954 | Coover et al. | |
| 2,716,101 A | 8/1955 | Coover, Jr. et al. | |
| 2,891,915 A | 6/1959 | McCormack et al. | |
| 3,326,852 A | 6/1967 | Thomas | |
| 3,442,854 A | 5/1969 | Curtius et al. | |
| 3,801,533 A | 4/1974 | Tetenbaum et al. | |
| 3,919,363 A | 11/1975 | Ura et al. | |
| 3,946,093 A | 3/1976 | Koto et al. | |
| 4,108,906 A | 8/1978 | Anderson | |
| 4,163,005 A | 7/1979 | Albright | |
| 4,218,332 A | 8/1980 | Schwab et al. | |
| 4,328,174 A | 5/1982 | Schmidt et al. | |
| 4,331,614 A | 5/1982 | Schmidt et al. | |
| 4,374,971 A | 2/1983 | Schmidt et al. | |
| 4,415,719 A | 11/1983 | Schmidt et al. | |
| 5,002,853 A * | 3/1991 | Aoai | G03F 7/039 430/270.1 |
| 5,216,113 A | 6/1993 | Schulz-Schlitte et al. | |
| 5,334,692 A | 8/1994 | Hess et al. | |
| 6,288,210 B1 | 9/2001 | Shobha et al. | |
| 6,291,630 B1 | 9/2001 | König et al. | |

(Continued)

FOREIGN PATENT DOCUMENTS

| | | |
|---|---|---|
| CA | 1116628 A | 1/1982 |
| CN | 101258194 A | 9/2008 |

(Continued)

OTHER PUBLICATIONS

U.S. Appl. No. 14/442,606, filed May 13, 2015.
U.S. Appl. No. 14/779,849, filed Sep. 24, 2015.
U.S. Appl. No. 15/311,674, filed Nov. 16, 2016.
U.S. Appl. No. 15/317,899, filed Dec. 9, 2016.
U.S. Appl. No. 15/511,410, filed Mar. 15, 2017.
U.S. Appl. No. 15/511,471, filed Mar. 15, 2017.
U.S. Appl. No. 15/511,445, filed Mar. 15, 2017.
U.S. Appl. No. 15/529,026, filed May 23, 2017.
U.S. Appl. No. 15/738,515, filed Dec. 20, 2017.

(Continued)

Primary Examiner — Brieann R Johnston
(74) Attorney, Agent, or Firm — Leydig, Voit & Mayer, Ltd.

(57) ABSTRACT

The present invention relates to the use of halogen-free sulphonic acid esters and/or sulphinic acid esters as flame retardant and/or flame retardant synergists in plastics. The invention furthermore relates to the use of said compounds as radical generators in plastics, particularly in order to increase the molecular weight of the plastics, to branch and/or cross-link the plastics, to reduce the molecular weight of the plastics, to influence the molecular weight distribution of the plastics and to graft unsaturated monomers to the plastics. The present invention furthermore relates to the use of flame-retardant plastic compositions in the electrical or electronics industry, construction industry, transport industry, preferably automobiles, aircraft, trains and ships, for medical applications, for household appliances, vehicle parts, consumer products, packaging, furniture and textiles.

13 Claims, No Drawings

(56) References Cited

U.S. PATENT DOCUMENTS

| | | | |
|---|---|---|---|
| 6,861,499 B2 | 3/2005 | Vinciguerra et al. | |
| 7,084,196 B2 * | 8/2006 | Troutman | C08K 5/0066 524/126 |
| 7,115,765 B2 | 10/2006 | Sprenger et al. | |
| 7,816,486 B2 | 10/2010 | Freitag et al. | |
| 8,058,329 B2 | 11/2011 | Just et al. | |
| 10,138,354 B2 | 11/2018 | Pfaendner et al. | |
| 10,214,631 B2 | 2/2019 | Pfaendner et al. | |
| 10,323,136 B2 | 6/2019 | Pfaendner et al. | |
| 10,364,340 B2 | 7/2019 | Pfaendner et al. | |
| 10,370,537 B2 | 8/2019 | Pfaendner et al. | |
| 10,450,442 B2 | 10/2019 | Pfaendner et al. | |
| 10,544,284 B2 | 1/2020 | Pfaendner et al. | |
| 2005/0020800 A1 | 1/2005 | Levchik et al. | |
| 2005/0176983 A1 | 8/2005 | Sprenger et al. | |
| 2007/0219295 A1 | 9/2007 | Levchik et al. | |
| 2008/0045673 A1 | 2/2008 | Piotrowski et al. | |
| 2008/0167405 A1 | 7/2008 | Just et al. | |
| 2009/0286060 A1 * | 11/2009 | Sala | C07D 209/48 428/220 |
| 2011/0196052 A1 * | 8/2011 | Hahn | C08K 5/5398 521/56 |
| 2012/0301662 A1 | 11/2012 | Yamashita et al. | |
| 2016/0052927 A1 | 2/2016 | Pfaendner et al. | |
| 2016/0272789 A1 | 9/2016 | Pfaendner et al. | |
| 2017/0043931 A1 * | 2/2017 | Menozzi | C08L 101/00 |
| 2017/0107375 A1 | 4/2017 | Pfaendner et al. | |
| 2017/0121499 A1 | 5/2017 | Pfaendner et al. | |
| 2017/0121536 A1 | 5/2017 | Marauska et al. | |
| 2017/0260362 A1 | 9/2017 | Pfaendner et al. | |
| 2017/0260363 A1 | 9/2017 | Pfaendner et al. | |
| 2017/0260366 A1 | 9/2017 | Pfaendner et al. | |
| 2017/0267835 A1 | 9/2017 | Groos et al. | |
| 2018/0186970 A1 | 7/2018 | Groos et al. | |
| 2019/0248927 A1 | 8/2019 | Klein et al. | |

FOREIGN PATENT DOCUMENTS

| | | | |
|---|---|---|---|
| CN | 102575062 A | 7/2012 | |
| CN | 102725339 A | 10/2012 | |
| CN | 104479323 A | 4/2015 | |
| CN | 106459255 A | 2/2017 | |
| DE | 2 648 701 A1 | 5/1977 | |
| DE | 2 736 696 A1 | 2/1978 | |
| DE | 2 834 884 A1 | 2/1979 | |
| EP | 2 450 401 A1 | 5/2012 | |
| EP | 2 955 209 A1 | 12/2015 | |
| GB | 1 544 417 A | 4/1979 | |
| JP | 2001-064462 A | 3/2001 | |
| KR | 10-2005-0002861 A | 1/2005 | |
| WO | 03/070736 A1 | 8/2003 | |
| WO | 2006/084488 A1 | 8/2006 | |
| WO | 2006/084489 A1 | 8/2006 | |
| WO | 2007/028731 A1 | 3/2007 | |
| WO | 2008/101845 A1 | 8/2008 | |
| WO | 2010/135398 A1 | 11/2010 | |
| WO | 2011/000019 A1 | 1/2011 | |
| WO | 2011/067197 A2 | 6/2011 | |
| WO | 2013/020696 A2 | 2/2013 | |
| WO | 2013/065448 A1 | 5/2013 | |
| WO | 2013/068437 A2 | 5/2013 | |
| WO | 2013/072295 A1 | 5/2013 | |
| WO | 2014/154636 A1 | 10/2014 | |
| WO | 2015/180888 A1 | 12/2015 | |
| WO | 2015/189034 A1 | 12/2015 | |
| WO | 2016/042038 A1 | 3/2016 | |
| WO | WO 2016/042040 A1 | 3/2016 | |
| WO | WO 2016/042043 A1 | 3/2016 | |
| WO | WO-2016042040 A1 * | 3/2016 | C09K 21/12 |

OTHER PUBLICATIONS

U.S. Appl. No. 16/344,830, filed Apr. 25, 2019.
U.S. Appl. No. 16/488,902, filed Aug. 26, 2019.
U.S. Appl. No. 16/649,656, filed Mar. 22, 2020.
Aubert et al., "Azoalkanes—novel flame retardants and their structure-property relationship," *Polymers Advanced Technologies* 22: 1529-1538 (2011).
Pawelec et al., "Triazene compounds as a novel and effective class of flame retardants for polypropylene," *Polymer Degradation and Stability* 97: 948-954 (2012).
European Patent Office, International Search Report in International Application No. PCT/EP2018/070197 (dated Oct. 31, 2018).
European Patent Office, Written Opinion in International Application No. PCT/EP2018/070197 (dated Oct. 31, 2018).
International Bureau of WIPO, International Preliminary Report on Patentability in International Application No. PCT/EP2018/070197 (dated Jan. 28, 2020).
China National Intellectual Property Administration, First Office Action in Chinese Patent Application No. 201880049547.7 (dated Aug. 30, 2021).
Ding, Practical Handbook for Plastics lndustm, vol. 1, Chemical Industry Press, pp. 684-688 (1995).
China National Intellectual Property Administration, Second Office Action in Chinese Patent Application No. 201880049547.7 (dated Apr. 15, 2022).
Korean Intellectual Property Office, Request for Submission of an Opinion in Korean Patent Application No. 10-2020-7002302 (dated Dec. 12, 2022).
China National Intellectual Property Administration, Notification of Grant of Patent Right including Allowed Claims in Chinese Patent Application No. 201880049547.7 (dated Aug. 25, 2022).
Aogo et al., "Conductive composition, and conductive film and conductive laminate using same," 20 May 2013 (May 20, 2013), retrieved from STN, abstract No. Database accession No. 2013:776139, Retrieved from: CA [online] Chemical Abstracts Service, Columbus, Ohio, US XP002785570.
Aubert et al., "Azoalkanes: a Novel Class of Additives for Cross-Linking and Controlled Degradation of Polyolefins," *Macromol. Sol. Eng.* 292(6): 707-714 (2007).
Domininghaus et al., Plastics—Properties and Applications, $8^{th}$ Edition 2012 Machine Trans. (pp. 66-69, 152-153, 242).

* cited by examiner

HALOGEN-FREE SULPHONIC ACID ESTER AND/OR SULPHINIC ACID ESTER AS FLAME RETARDANT, FLAME RETARDANT SYNERGISTS AND RADICAL GENERATORS IN PLASTICS

CROSS-REFERENCE TO RELATED APPLICATIONS

This patent application is the U.S. national phase of International Application No. PCT/EP2018/070197, filed on Jul. 25, 2018, which claims the benefit of German Patent Application No. 10 2017 212 772.4, filed Jul. 25, 2017, the disclosures of which are incorporated herein by reference in their entireties for all purposes.

The present invention relates to the use of halogen-free sulfonic esters and/or sulfinic esters as flame retardants and/or flame retardant synergists in plastics. The invention further relates to the use of these compounds as radical generators in plastics, especially for increasing the molecular weight of the plastics, for branching and/or crosslinking the plastics, for reducing the molecular weight of the plastics, for influencing the molecular weight distribution of the plastics, and for grafting unsaturated monomers onto the plastics. The present invention additionally relates to the use of the flame-retarded plastics compositions in the electrical or electronics industry, building industry, transport industry, preferably automobiles, aircraft, railroads and ships, for medical applications, for household appliances, vehicle parts, consumer goods, packaging, furniture, and textiles.

The majority of plastics are combustible and flammable with comparative ease. To reduce or eliminate the fire risk from plastics in certain applications, therefore, it is absolutely necessary to reduce the flammability and to use flame-resistant plastics compositions. This necessity is generally met by adding flame retardants to the plastic, with the aim of reducing ignition for a certain time or significantly retarding the spread of fire. Traditional flame retardants have been based on chlorine- and bromine-containing compounds (the latter usually in combination with antimony trioxide), on phosphorus-containing, on nitrogen-containing compounds, and on metal hydroxides such as aluminum hydroxide (ATH) or magnesium hydroxide (MDH). More recently there has been a frequent preference, for reasons of toxicology and ecotoxicology, for halogen-free flame retardant solutions.

For the production of flame-retarded plastics there are a multiplicity of flame retardants, which in general are used on a substrate-specific basis, for a defined polymer and a defined sector of use, in accordance with the standards governing that application. Flame-retarded plastics are used primarily in electrical and electronics applications, in the transport sector (rail, aircraft, automobile), in textiles, and in building.

One class of additive and also class of flame retardant which has been developed in recent years comprises radical generators based on oxyimides. These are described in, for example, WO 2014/154636 A1, WO 2015/180888 A1, WO 2015/189034 A1, WO 2016/042038 A1, WO 2016/042040 A1, WO 2016/042043 A1 from Fraunhofer-Gesellschaft.

Sulfonic acid derivatives have been described for use as flame retardants to date only with halogen-containing substituents; conventionally, the halogen groups are responsible for the flame retardant effect—see, for example, U.S. Pat. No. 4,108,906, DE 28 34 884 or DE 27 36 696.

WO 2011/067197 A2 describes an oxygen scavenger composition for food packaging applications, comprising (I) a polymer, (II) an organic oxidation additive based on a cyclic oxyimide, (III) a metal salt, (IV) an oxidizing substance, which is consumed, and (V) optionally additives.

WO 2007/028731 A1 relates to a degradable polymer article where degradation is accelerated using an N-hydroxyimide derivative.

The flame retardants and radical generators described in the prior art have certain disadvantages. For example, they exhibit inadequate compatibility or solubility in polymers, and low activity is one of the possible consequences of this. Moreover, the compounds described in the prior art are often difficult to synthesize.

On that basis, an object of the present invention was to provide compounds, for use as flame retardants and/or flame retardant synergists, which can be used in plastics and which exhibit high compatibility or solubility in these plastics. Moreover, the aim through the use of these substances is to achieve improved activity—that is, they are to be active even in small amounts. Furthermore, the compounds are to be easy to access synthetically, preferably from industrially available reactants, allowing them to be produced cost-effectively.

A further object of the present invention was that the compounds cannot only be used as new flame retardants and/or flame retardant synergists but also, furthermore, that they can be employed as radical generators as well and so are suitable for a range of other applications.

This object is achieved through the use of at least one halogen-free sulfonic ester and/or at least one halogen-free sulfinic ester as flame retardant and/or flame retardant synergist in plastics.

Advantageous embodiments of the inventive use of halogen-free sulfonic esters and/or halogen-free sulfinic esters are described herein.

Furthermore, the present invention relates to a flame-retarded plastics composition having the features below.

A flame-retarded plastics composition comprising components (A) to (D) or consisting of these components:
(A) 30 to 99.9 wt % of at least one plastic selected from the group consisting of thermoplastics, elastomeric plastics, thermoset plastics and mixtures thereof;
(B) 0.1 to 20 wt % of at least one flame retardant, and mixtures thereof;
(C) 0 to 70 wt % of at least one non-(B) flame retardant or flame retardant synergist, and mixtures thereof;
(D) 0 to 50 wt % of at least one additive or adjuvant;
where the weight fractions of components (A) to (D) add up to 100 wt %.

Advantageous embodiments of this flame-retarded plastics composition are further described herein.

The present invention, moreover, relates to the use of the flame-retarded plastics composition of the invention in the electrical or electronics industry, mechanical engineering and apparatus construction, building industry, transport industry, preferably automobiles, aircraft, railroads and ships, for medical applications, for household appliances, vehicle parts, cables, consumer goods, packaging, furniture, and textiles.

The invention further relates to the use of sulfonic acid azanyl esters as radical generators for modifying plastics. Advantageous uses and methods for implementation thereof are described herein.

Definitions of Terms:

"Sulfonic esters" in the sense of the present invention have the following structural unit, for which the moiety "O—N" is ruled out as $R^1$. This moiety is explicitly not covered by the hypernym heteroalkyl.

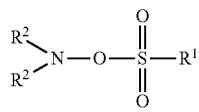

"Sulfinic esters" in the sense of the present invention have the following structural unit, for which the moiety "O—N" is ruled out as $R^1$. This moiety is explicitly not covered by the hypernym heteroalkyl.

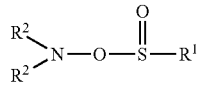

"Sulfonic acid azanyl esters" are understood in accordance with the present invention to be compounds having the structural unit depicted below on the left; depicted below on the right are sulfinic acid azanyl esters; the moiety "O—N" here is ruled out for $R^1$ in both cases. This moiety is explicitly not included by the hypernym heteroalkyl.

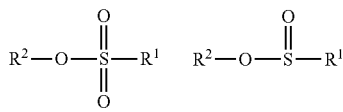

In the sense of the present invention, "unsaturated monomers" are monomers having a double or triple bond.

By "grafting" in the sense of the present invention is meant the application of further chains to the main chain of a polymer. A "graftable group" refers to a functional group which is capable of linking onto the main chain of a polymer.

A "degradable polyolefin" in the sense of the present invention refers to a polyolefin whose molecular weight can be reduced by radical processes.

By the "half-life" of the halogen-free sulfonic or sulfinic ester is meant, in the sense of the present invention, the time after which half of the halogen-free sulfonic or sulfinic ester has dissociated into radicals at a defined temperature, this temperature being preferably in the range from 180 to 280° C. and especially preferably in the range from 200 to 250° C.

"Controlled degradation of polyolefins" in the sense of the present invention refers to the lowering of the molecular weight of the polyolefin toward a target value in a thermal process with addition of a defined amount of radical generators.

"Flame retardant synergists" are understood in accordance with the present invention to be compounds which increase the flame-retardant activity of other flame retardants; in other words, on addition of the flame retardant synergist, a better flame-retardant activity is achieved than if the total amount of flame retardant and flame retardant synergist is lower or is equal to the original amount of flame retardant. It is not impossible for flame retardant synergists to also act themselves as flame retardants.

Use as Flame Retardant and/or Flame Retardant Synergist

One aspect of the present invention relates to the use of at least one halogen-free sulfonic ester and/or at least one halogen-free sulfinic ester as flame retardants and/or flame retardant synergists in plastics. Preferred embodiments of the inventive use are specified below.

According to one preferred embodiment of the present invention, the halogen-free sulfonic esters and/or halogen-free sulfinic esters are halogen-free sulfonic acid azanyl esters of the general formula (Ia) and/or halogen-free sulfinic acid azanyl esters of the general formula (Ib);

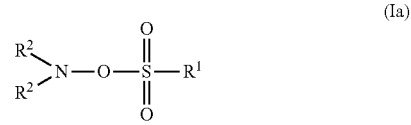 (Ia)

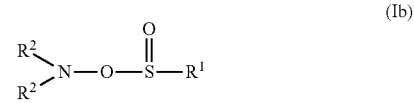 (Ib)

where the radicals $R^1$ and $R^2$ each independently of one another are selected from the group consisting of substituted or unsubstituted alkyl groups, heteroalkyl groups, cycloalkyl groups, heterocycloalkyl groups, acyl groups, aryl groups und heteroaryl groups, and two radicals $R^2$ can form a cyclic system.

In a further preferred embodiment of the present invention, the halogen-free sulfonic ester is a sulfonic acid azanyl ester selected from the group consisting of one of the compounds having the following formulae, or mixtures thereof:

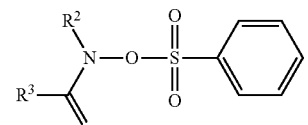

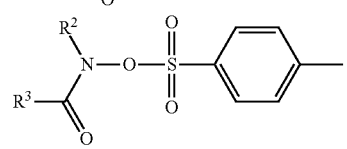

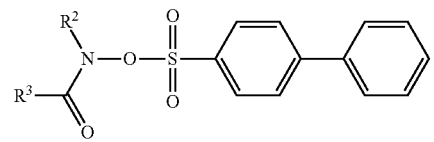

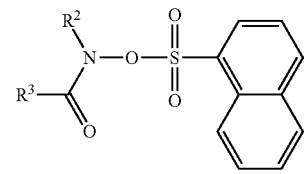

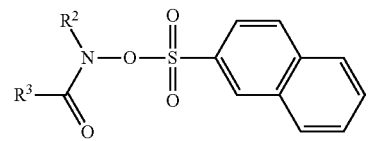

-continued

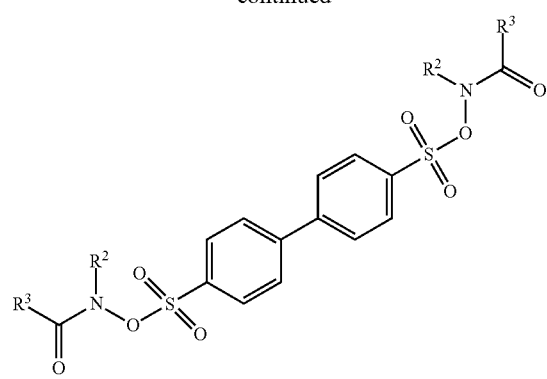

where R² has the same definition as indicated above and preferably is selected from the group consisting of substituted or unsubstituted alkyl groups, heteroalkyl groups, cycloalkyl groups, heterocycloalkyl groups; and R³ is selected from the group consisting of substituted or unsubstituted alkyl groups, heteroalkyl groups, cycloalkyl groups, heterocycloalkyl groups; where R² and R³ can form a cyclic system; and where the aromatic structural units can be substituted; where alkyl groups are preferred as substituents.

According to another preferred embodiment of the present invention, the halogen-free sulfonic ester is a sulfonic acid azanyl ester having the formula indicated below:

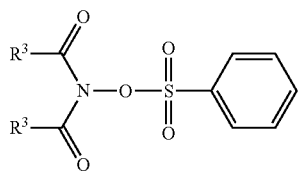

where R³ is selected from the group consisting of substituted or unsubstituted alkyl groups, heteroalkyl groups, cycloalkyl groups, heterocycloalkyl groups and a cyclic system formed from two radicals R³.

In another preferred embodiment of the present invention, the halogen-free sulfonic ester is a sulfonic acid azanyl ester selected from the group consisting of one of the compounds having the following formulae, or mixtures thereof:

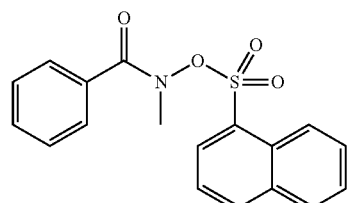

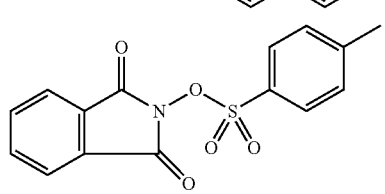

-continued

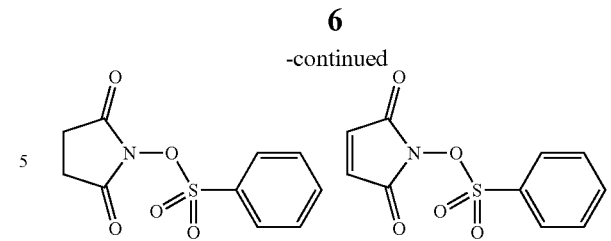

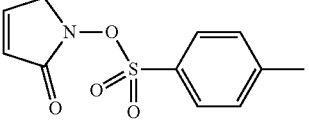

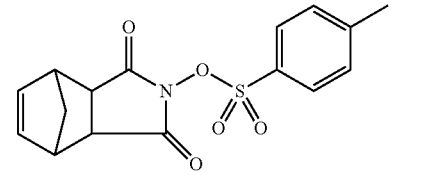

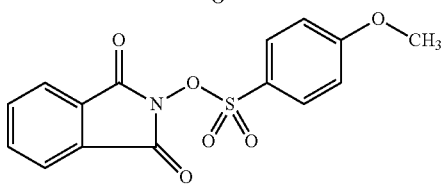

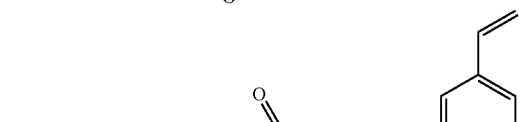

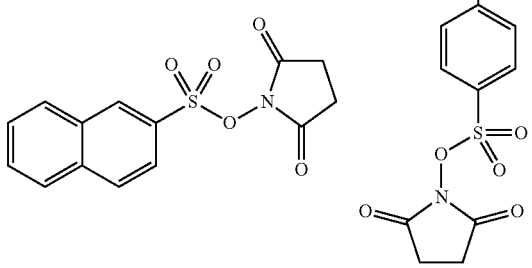

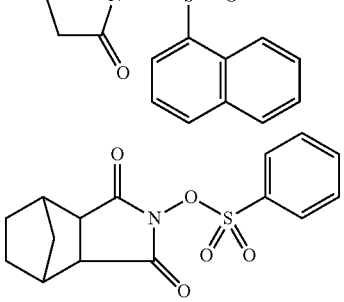

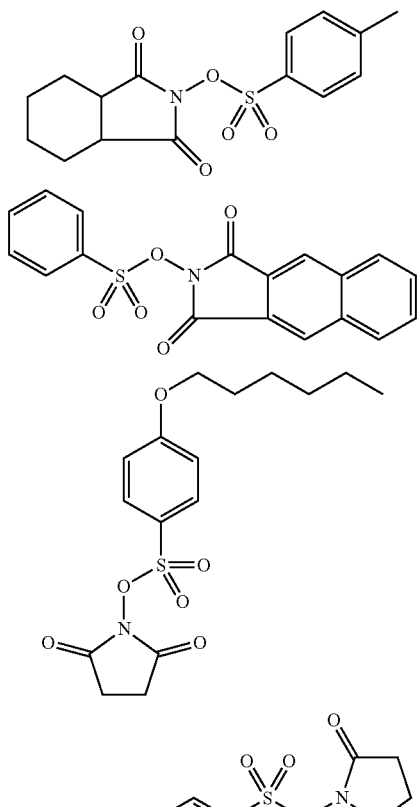
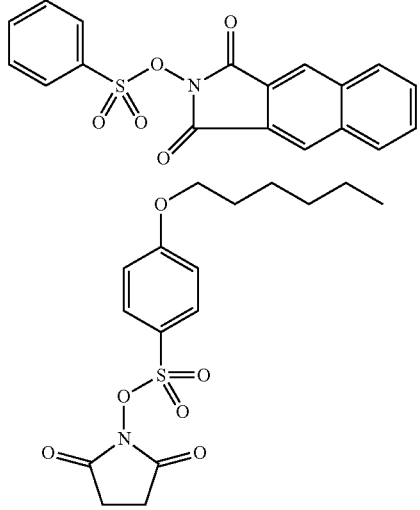
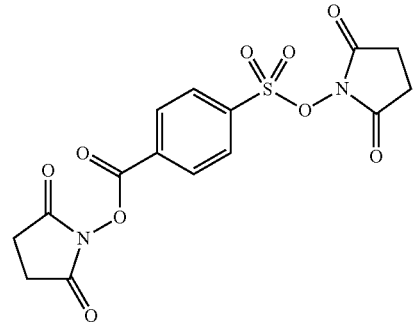
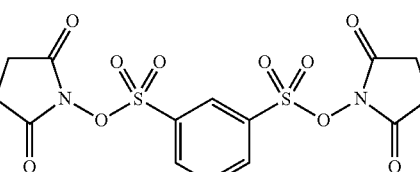
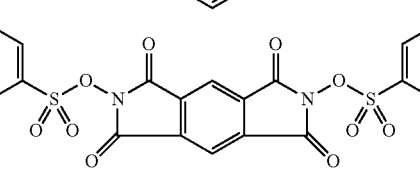
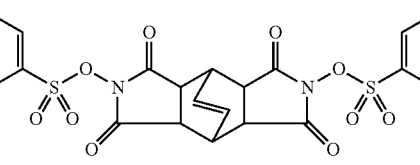
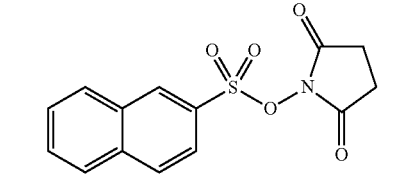
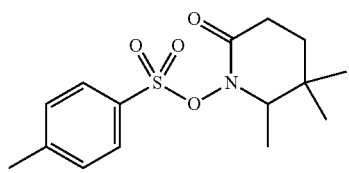
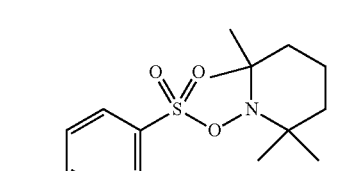
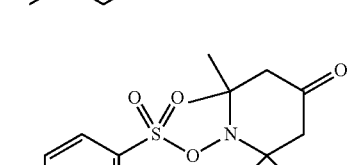
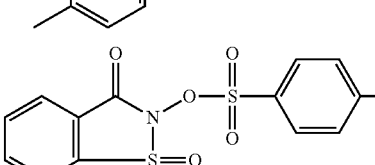
Examples of sulfonic esters of the invention which contain a heteroaryl group are:
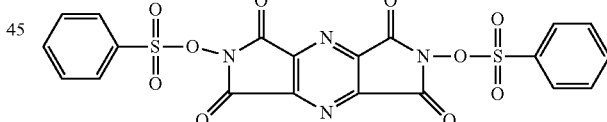
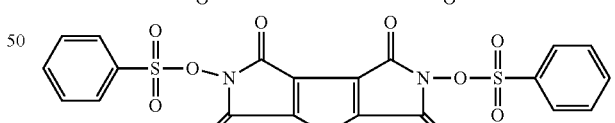
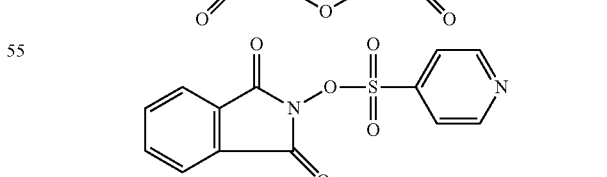
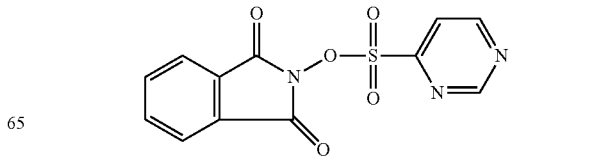

-continued

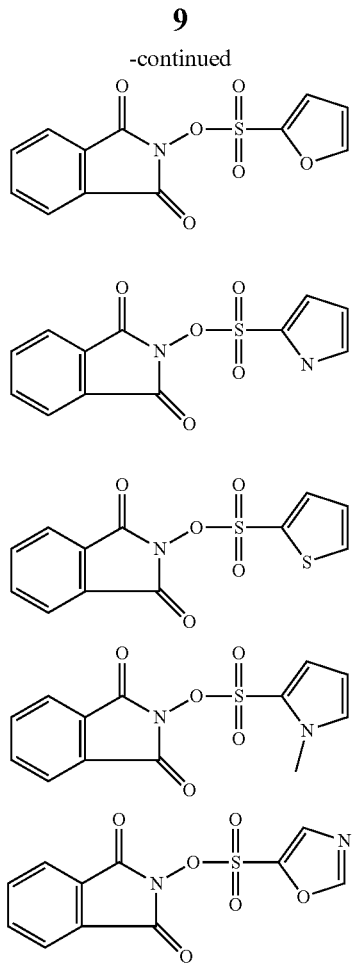

In another preferred embodiment of the present invention, the halogen-free sulfonic ester is a sulfonic acid azanyl ester in oligomeric or polymeric form, which is prepared by polymerization or polymer-analogous reaction, more preferably selected from monomers of the group consisting of one of the compounds having the formulae below, or mixtures thereof:

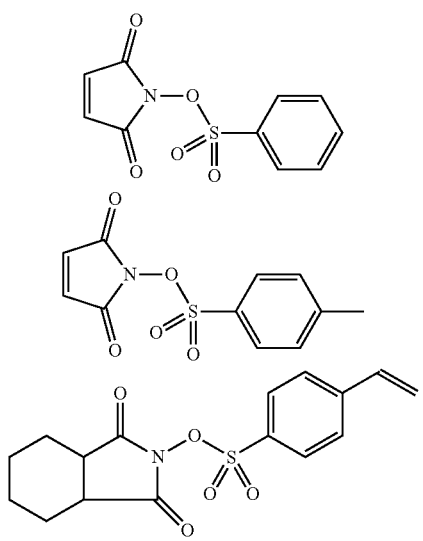

-continued

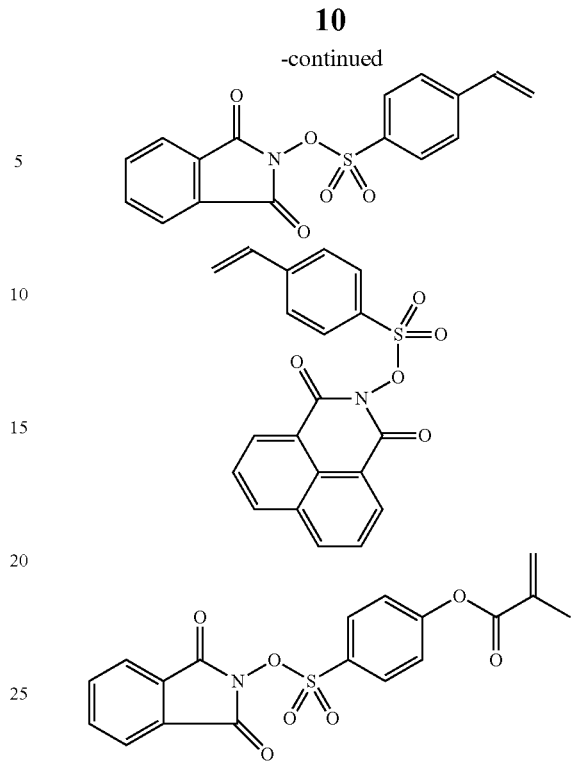

In a further preferred embodiment of the present invention, the plastic is selected from the group consisting of
a) polymers of olefins or diolefins, preferably polyethylene, especially preferably LDPE, LLDPE, VLDPE, ULDPE, MDPE, HDPE, UHMWPE, polyethylene prepared using metallocene catalysts, polypropylene, long-chain-branched polypropylene-copolymers prepared with alpha-olefins as comonomers, such as for example with 1-butene, 1-hexene, 1-octene or 1-octadecene, polyisobutylene, poly-4-methyl-1-pentene, polybutadiene, polyisoprene, such as for example also natural rubber (NR), polycyclooctene, polyalkylene-carbon monoxide copolymers, copolymers in the form of random or block structures, especially polypropylene-polyethylene (EP), EPM or EPDM with, for example, 5-ethylidene-2-norbornene as comonomer, ethylene-vinyl acetate (EVA), ethylene-acrylate, especially ethylene-butyl acrylate, ethylene-acrylic acid and salts thereof, and also terpolymers, especially ethylene-acrylic acid-glycidyl acrylate, graft polymers, especially polypropylene-g-maleic anhydride, polypropylene-g-acrylic acid and polyethylene-g-acrylic acid, polyethylene-polybutyl acrylate-graft-maleic anhydride;
b) polystyrene, poly-alpha-methyl styrene, polyvinylnaphthalene, polyvinylbiphenyl, polyvinyltoluene, styrene-butadiene (SB), styrene-butadiene-styrene (SBS), styrene-ethylene-butylene-styrene (SEBS), styrene-ethylene-propylene-styrene, styrene-isoprene, styrene-isoprene-styrene (SIS), styrene-butadiene-acrylonitrile (ABS), styrene-acrylonitrile (SAN), styrene-acrylonitrile-acrylate (ASA), styrene-ethylene, styrene-maleic anhydride polymers including corresponding graft copolymers, especially styrene on butadiene, maleic anhydride on styrene, butadiene-styrene or styrene-ethylene-butylene-styrene, and also graft copolymers of methyl methacrylate, styrene-butadiene and styrene-butadiene-acrylonitrile (ABS) or styrene-butadiene-methacrylonitrile (MABS), and also hydrogenated polystyrene derivatives such as, for example, polyvinylcyclohexane;
c) halogen-containing polymers, especially polyvinyl chloride (PVC), polychloroprene and polyvinylidene chloride (PVDC), copolymers of vinyl chloride and vinylidene chloride or of vinyl chloride and vinyl acetate, chlorinated polyethylene, polyvinylidene fluoride, epichlorohydrin homopolymers and copolymers, especially with ethylene oxide (ECO);
d) polymers of unsaturated esters, especially polyacrylates and polymethacrylates, more preferably polymethyl methacrylate (PMMA), polybutyl acrylate, polylauryl acrylate, polystearyl acrylate, polyacrylonitrile, polyacrylamides, copolymers, especially polyacrylonitrile-polyalkyl acrylate;
e) polymers of unsaturated alcohols and derivatives, especially polyvinyl alcohol, polyvinyl acetate, polyvinylbutyral, polyallyl phthalate, polyallylmelamine;
f) polyacetals, especially polyoxymethylene (POM) or copolymers especially with butanal;
g) polyphenylene oxides and blends with polystyrene or polyamides;
h) polymers of cyclic ethers, especially polyethylene glycol, polypropylene glycol, polyethylene oxide and polypropylene oxide;
i) polyurethanes, preferably of hydroxy-terminated polyethers or polyesters and aromatic or aliphatic isocyanates, as for example tolylene 2,4- or 2,6-diisocyanate or methylenediphenyl diisocyanate, especially also linear polyurethanes (TPU), polyureas;
j) polyamides, especially PA 6, PA 6.6, PA 6.10, PA 4.6, PA 4.10, PA 6.12, PA 10.10, PA 12.12, PA 11, PA 12, and also semiaromatic and aromatic polyamides, especially polyphthalamides, more preferably prepared from terephthalic acid and/or isophthalic acid and aliphatic diamines, as for example hexamethylenediamine or m-xylylenediamine, or from aliphatic dicarboxylic acids, especially adipic acid or sebacic acid, and aromatic diamines, especially 1,4- or 1,3-diaminobenzene;
k) polyimides, especially polyamide imides, polyetherimides, polyesterimides, poly(ether)ketones, polysulfones, especially polyethersulfones, polyarylsulfones, polyphenylene sulfides, polybenzimidazoles, polyhydantoins;
l) polyesters of aliphatic or aromatic dicarboxylic acids and diols or of hydroxycarboxylic acids such as, for example, polyethylene terephthalate (PET), polybutylene terephthalate (PBT), polypropylene terephthalate (PTT), polyethylene naphthalate (PEN), poly-1,4-dimethylolcyclohexane terephthalate, polyhydroxybenzoate, polyhydroxynaphthalate, polylactic acid (PLA), polybutylene succinate (PBS), polyhydroxyalkanoates (PHA) such as, for example, polyhydroxybutyric acid (PHB) or polyhydroxyvaleric acid (PHV); polycaprolactone;
m) polycarbonates, polyester carbonates, and also blends of polycarbonates with other polymers, especially PC/ABS, PC/PBT, PC/PET/PBT;
n) cellulose derivatives, especially cellulose nitrate, cellulose acetate, cellulose propionate, cellulose butyrate;
o) epoxy resins, consisting of di- or polyfunctional epoxide compounds in combination with, for example, hardeners based on amines, anhydrides, dicyandiamide, mercaptans, isocyanates or catalytic hardeners;
p) phenolic resins such as, for example phenol-formaldehyde resins, urea-formaldehyde resins, melamine-formaldehyde resins;
q) unsaturated polyester resins made from unsaturated dicarboxylic acids and diols with vinyl compounds, e.g. styrene, alkyd resins;
r) silicones, for example based on dimethylsiloxanes, methyl phenyl siloxanes or diphenylsiloxanes, e.g. vinyl group-terminated;
s) and also mixtures, combinations or blends of two or more of the polymers stated under a) to o).

Insofar as the polymers specified under a) to r) are copolymers, they may be present in the form of random ("statistical"), block or "tapered" structures. Furthermore, the stated polymers may be present in the form of linear, branched, star-shaped or hyperbranched structures.

Insofar as the polymers specified under a) to r) are stereoregular polymers, they may be present in the form of isotactic, stereotactic or else atactic forms, or as stereoblock copolymers.

Furthermore, the polymers specified under a) to r) may have not only amorphous but also (semi)crystalline morphologies.

The polyolefins stated under a) may optionally also be in crosslinked form, e.g., crosslinked polyethylene, which is then identified as X-PE.

The stated polymers a) to r) may take the form not only of virgin material but also of recyclates, e.g., as production wastes or from collections of renewable materials ("post-consumer" recyclates).

Flame-Retarded Plastics Composition

Another aspect of the present invention relates to a flame-retarded plastics composition comprising components (A) to (D) or consisting of these components:
(A) 30 to 99.9 wt % of at least one plastic selected from the group consisting of thermoplastics, elastomeric plastics, thermoset plastics and mixtures thereof;
(B) 0.1 to 20 wt % of at least one flame retardant as defined above for the use;
(C) 0 to 70 wt % of at least one non-(B) flame retardant or flame retardant synergist, and mixtures thereof;
(D) 0 to 50 wt % of at least one additive or adjuvant;
where the weight fractions of components (A) to (D) add up to 100 wt %.

Preferred embodiments of the flame-retarded plastics composition of the invention are specified below.

According to one preferred embodiment of the flame-retarded plastics composition of the invention, component (C) is selected from the group consisting of
i. inorganic flame retardants, preferably $Al(OH)_3$, $Mg(OH)_2$, $AlO(OH)$, $MgCO_3$, phyllosilicates, especially montmorillonite, which may be unmodified or organically modified, sepiolite, attapulgite, vermiculite, wollastonite, double salts, especially Mg Al silicates, POSS (Polyhedral Oligomeric Silsesquioxane) compounds, huntite, hydromagnesite or halloysite, and also $Sb_2O_3$, $Sb_2O_5$, $MoO_3$, zinc stannate, zinc hydroxystannate, mica, calcium carbonate;
ii. nitrogen-containing flame retardants, preferably melamine, melem, melam, melon, melamine derivatives, melamine condensation products or melamine salts, benzoguanamine, polyisocyanurates, allantoin, phosphacenes, especially melamine cyanurate, melamine phosphate, dimelamine phosphate, melamine hypophosphite, melamine pyrophosphate, melamine polyphosphate, melamine metal phosphates, especially melamine aluminum phosphate, melamine zinc phosphate, melamine magnesium phosphate, and the corresponding pyrophosphates and polyphosphates, poly[2,4-(piperazin-1,4-yl)-6-(morpholin-4-yl)-1,3,5- triazine], ammonium polyphosphate, melamine borate and melamine hydrobromide, polymer of ethylenediamine and 4,6-dichloro-N-phenyl-1,3,5-triazine-2-amine, poly(1,3,5-triazine-2-aminoethanol diethylenetriamine, ammonium sulfamate;

iii. radical initiators, preferably alkoxyamines, hydroxylamine esters, azo compounds, dicumyl or polycumyl; and also oxyimides according to WO 2014/154636 A1, WO 2015/180888 A1, WO 2015/189034 A1, WO 2016/042038 A1, WO 2016/042040 A1, WO 2016/042043 A1;

iv. phosphorus-containing flame retardants, preferably red phosphorus, phosphates, especially resorcinol diphosphate, bisphenol A diphosphate and oligomers thereof, bisphenol A bis(dicresyl)phosphate, triphenyl phosphate, ethylenediamine diphosphate, phosphinates, especially salts of hypophosphorous acid and derivatives thereof, especially alkyl phosphinate salts, more preferably aluminum diethylphosphinate, zinc diethylphosphinate or aluminum phosphinate, aluminum hypophosphite, calcium hypophosphite, sodium hypophosphite, aluminum phosphite, aluminum phosphonate, phosphonate esters, aluminum methyl methylphosphonate, oligomeric and polymeric derivatives of methanephosphonic acid, as, for example, poly(1,3-phenylene methylphosphonate) 9,10-dihydro-9-oxa-10-phosphorylphenanthrene-10-oxide (DOPO) and substituted compounds thereof, as for example glycerol tri(DOPO-acrylate) and polymeric salts thereof, as for example poly-zinc-DOPO, polymeric phosphorus diamidate, 4,4'-bishydroxydeoxybenzoin polyphosphonate, 2-carboxyethylmethylphosphinic acid-2-carboxyethylphenylphosphinic acid, diethyl N,N'-bis(2-hydroxyethyl)aminomethylphosphonate, dimethyl propyl phosphonate, dimethylspirophosphonate, diphenylcresyl phosphates, hydroquinone bis(diphenyl phosphate);

v. halogen-containing flame retardants based on chlorine and bromine, preferably polybrominated diphenyl oxides, especially decabromodiphenyl oxide, tris(3-bromo-2,2-bis(bromomethyl)propyl) phosphate, tris (tribromoneopentyl) phosphate, tetrabromophthalic acid, 1,2-bis(tribromophenoxy)ethane, hexabromocyclododecane, dibromoneopentyl glycol, brominated diphenylethane, 1,3,5-tris(2,3-dibromopropyl) isocyanurate, ethylenebis(tetrabromophthalimide), tetrabromobisphenol A, tris(tribromoneopentyl) alcohol, brominated polystyrene, brominated polybutadiene, polystyrene-brominated, polybutadiene copolymers, brominated epoxy resin, brominated polycarbonate with or without end group blocking, polypentabromobenzyl acrylate, preferably in combination with $Sb_2O_3$ and/or $Sb_2O_5$;

vi. borates, especially zinc borate or calcium borate with and without carrier material;

vii. sulfur-containing compounds, preferably elemental sulfur, disulfides and polysulfides, thiuram sulfide, dithiocarbamates, mercaptobenzothiazole and sulfenamides;

viii. antidrip agents, especially polytetrafluoroethylene;

ix. silicon-containing compounds, especially polyphenylsiloxanes;

x. salts of sulfonic acids such as, for example, phosphonium sulfonate, potassium perfluorobutanesulfonate, potassium p-toluenesulfonate, potassium diphenylsulfone sulfonate;

xi. smoke suppressants such as, for example, molybdenum oxide, ammonium octamolybdate, copper molybdate, zinc molybdate, molybdate complexes e.g. calcium molybdate, calcium molybdate zinc, zinc molybdate on magnesium silicate carriers;

xii. natural substances with flame-retardant effect such as lignin, chitosan, phytic acid;

xiii. carbon compounds such as graphite, expandable graphite, graphene or carbon nanotubes (CNT);

xiv. and also mixtures, combinations or blends of two or more of the substances stated under i. to xiii.

The halogen-containing flame retardants stated under e) are in many cases commercial products, which are available commercially from the companies Albemarle, Lanxess/Great Lakes or ICL-IP, for example.

Preferred flame retardants from group (C) are especially:

Radical initiators in the sense of the present invention are compounds which, through thermal and light-induced cleavage, are able to generate radicals. Suitable radical initiators for the present applications here are those which have sufficient thermal stability for the plastics or coatings processing operations, i.e., those which on processing do not yet form any quantities, or only very small quantities, of radicals, and give rise to spontaneous radical generation only at higher temperatures, of the kind occurring only in the event of fire. The respective processing operations and temperatures for coatings and plastics processing operations are known to the skilled person. Alternatively, plastics processing operations and associated temperatures may be found in the technical literature, such as, for example, H. Domininghaus, P. Elsner, P. Eyerer. T. Hirth, Kunststoffe, 8th edition, Springer 2012.

The radical initiator here is preferably selected from the group consisting of N-alkoxyamines, —C—C— radical initiators, radical initiators with azo groups (—N=N—), radical initiators with hydrazine groups (—NH—HN—), radical initiators with hydrazone groups (>C=N—NH—), radical initiators with azine groups (>C=N—N=C<), radical initiators with triazene groups (—N=N—N<).

The preparation of suitable azo compounds is described for example in M. Aubert et al., Macromol. Sci. Eng. 2007, 292, 707-714 or in WO 2008101845; the preparation of hydrazones and azines is described in M. Aubert et al., Pol. Adv. Technol. 2011, 22, 1529-1538; the preparation of triazenes is described in W. Pawelec et al., Pol. Degr. Stab. 2012, 97, 948-954.

The radical initiator here is more preferably selected from the group consisting of a) N-alkoxyamines according to the structural formula depicted below

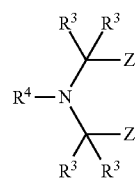

where $R^3$ is hydrogen or an optionally substituted alkyl, cycloalkyl, aryl, heteroaryl or acyl radical, especially a C1 to C4 alkyl radical, $R^4$ is an alkoxy, aryloxy, cycloalkoxy, aralkoxy or acyloxy radical, Z is hydrogen or an optionally substituted alkyl, cycloalkyl, aryl, heteroaryl or acyl radical, and the two radicals Z may also form a closed ring, which may optionally be substituted by ester, ether, amine, amide, carboxyl or urethane groups, b) azo compounds according to the structural formulae depicted below or

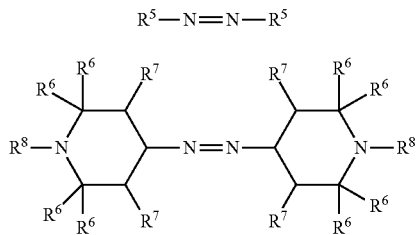

where $R^5$ is an alkyl, cycloalkyl or aryl radical, $R^6$ at each occurrence is identical or different and is a linear or branched alkyl radical, $R^7$ at each occurrence is identical or different and is hydrogen or a linear or branched alkyl radical, and $R^8$ at each occurrence is identical or different and is an alkyl, alkoxy, aryloxy, cycloalkyloxy, aralkoxy or acyloxy radical, c) dicumyl according to the structural formula depicted below

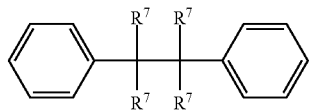

where $R^7$ has the definition specified above, and is preferably methyl, d) and/or polycumyl according to the structural formula depicted below

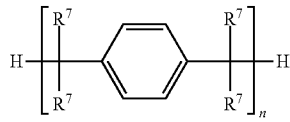

where $R^7$ has the definition specified above, and is preferably methyl, and $2<n<100$.

Typical examples of the aforementioned N-alkoxyamines of the specified structure are as follows:
1-cyclohexyloxy-2,2,6,6-tetramethyl-4-octadecylaminopiperidine; bis(1-octyloxy-2,2,6,6-tetramethylpiperidin-4-yl) sebacate; 2,4-bis[(1-cyclohexyloxy-2,2,6,6-tetramethylpiperidin-4-yl)butylamino]-6-(2-hydroxyethylamino-S-triazine; bis(1-cyclohexyloxy-2,2,6,6-tetramethylpiperidin-4-yl) adipate;
2,4-bis[(1-cyclohexyloxy-2,2,6,6-tetra methylpiperidin-4-yl)butylamino]-6-chloro-S-triazine; 1-(2-hydroxy-2-methylpropoxy)-4-hydroxy-2,2,6,6-tetramethylpiperidine; 1-(2-hydroxy-2-methylpropoxy)-4-oxo-2,2,6,6-tetramethylpiperidine; 1-(2-hydroxy-2-methylpropoxy)-4-octadecanoyloxy-2,2,6,6-tetramethylpiperidine; bis(1-(2-hydroxy-2-methylpropoxy)-2,2,6,6-tetramethylpiperidin-4-yl) sebacate; bis(1-(2-hydroxy-2-methylpropoxy)-2,2,6,6-tetramethylpiperidin-4-yl) adipate; 2,4-bis{N-[1-(2-hydroxy-2-methylpropoxy)-2,2,6,6-tetramethylpiperidin-4-yl]-N-butylamino}-6-(2-hydroxyethylamino)-S-triazine); 4-piperidinol, 2,2,6,6-tetramethyl-1-(undecyloxy)-4,4'-carbonate; the reaction product of 2,4-bis[(1-cyclohexyloxy-2,2,6,6-tetramethylpiperidin-4-yl)butylamino]-6-chloro-S-triazine with N,N'-bis(3-aminopropylethylenediamine); the oligomer compound which is the condensation product of 4,4'-hexamethylene bis(amino-2,2,6,6-tetramethylpiperidine) and 2,4-dichloro-6-[(1-cyclohexyloxy-2,2,6,6-tetramethyl-4-yl)butylamino]-S-triazine, capped at the ends with 2-chloro-4,6-bis(dibutylamino)-S-triazine; aliphatic hydroxylamine such as, for example, disterarylhydroxylamine; and also compounds of the formula

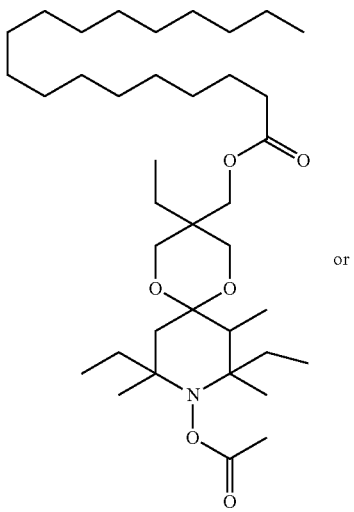

or

-continued

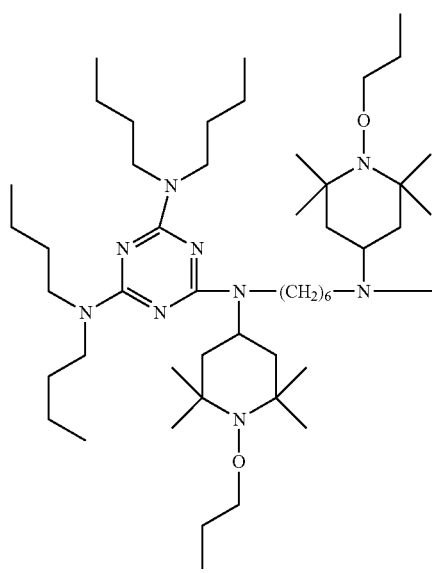

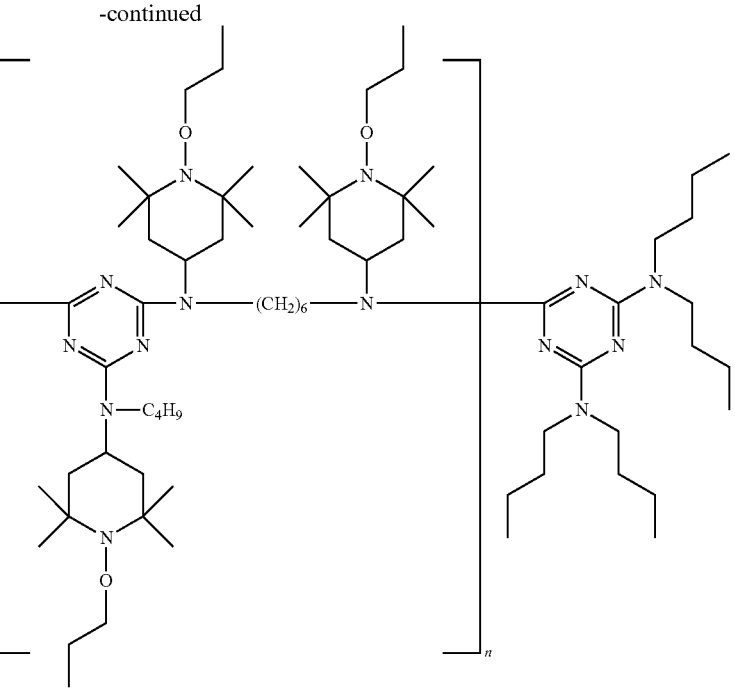

in which n is 1-15.

The compounds stated above are in some cases commercial products and are traded under the following trade names: FLAMESTAB NOR 116 ®, TINUVIN NOR 371 ®, IRGATEC CR 76 ® from BASF SE, Hostavin NOW® from Clariant or ADK Stab LA 81 ® from Adeka. Dicumyl and polycumyl are commercial products available, for example, from United Initiators.

Sulfur-containing flame retardants are likewise radical initiators with disulfide and/or polysulfide groups (—S—S—) or thiol groups (—S—H), and also thiuram sulfides such as tetramethylthiuram disulfide, dithiocarbamates, such as zinc diethyldithiocarbamate or sodium dimethyldithiocarbamate, mercaptobenzothiazoles such as 2-mercaptobenzothiazole, and sulfenamides such as N,N-dicyclohexyl-2-benzothiazolesulfenamide, for example. An example of a polysulfide is elemental sulfur; other polysulfides are described in U.S. Pat. No. 4,218,332, for example.

Disulfides, polysulfides, thiols, thiuram sulfides, dithiocarbamates, mercaptobenzothiazoles and sulfenamides are available commercially. Sulfenamides can be prepared, for example, according to T. Tirri et al., Polymers, 8, 360.

Further suitable radical initiators are oxyimides and derivatives thereof such as hydroxyimide esters or hydroxyimide ethers, as are described in accordance with WO 2014/154636 A1, WO 2015/180888 A1, WO 2015/189034 A1, WO 2016/042038 A1, WO 2016/042040 A1, WO 2016/042043. The disclosure content of these patent applications with regard to the aforesaid oxyimides and derivatives thereof such as hydroxyimide esters or hydroxyimide ethers is also part of the present patent application.

The combination of the sulfonic acid derivatives of the invention with another radical initiator may be especially advantageous, since here the formation of radicals may take place at low decomposition temperatures and/or may be adjusted as required.

The at least one further flame retardant may in particular also be a phosphorus-containing flame retardant. Preferred phosphorus-containing flame retardants are phosphinates of the following structures:

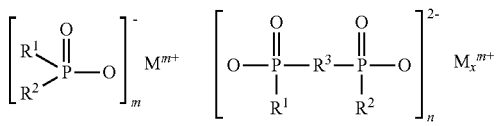

where preferably R1 and R2 are identical or different and are selected from linear or branched C1-C6 alkyl and/or aryl; M is selected from the group consisting of Mg, Ca, Al, Sb, Sn, Ge, Ti, Fe, Zr, Ce, Bi, Sr, Mn, Li, Na, K, Zn and/or a protonated nitrogen base, preferably calcium ions, magnesium ions, aluminum ions and/or zinc ions; and m is 1-4, preferably 2 or 3; n is 1-4, preferably 11 or 3; x is 1-4, preferably 11 or 2. In one particularly preferred embodiment, $R_1$ is alkyl, $R_2$ is alkyl and M is Al or Zn.

A particularly preferred example of a phosphinate of the invention are the commercially available Exolit OP® products from Clariant SE.

Further preferred phosphorus-containing flame retardants are metal salts of hypophosphorous acid with a structure according to the formula

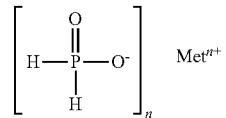

where Met is a metal selected from groups I, II, III and IV of the Periodic Table of the Elements, and n is a number from 1 to 4, corresponding to the charge of the corresponding metal ion Met. $Met^{n+}$ is for example $Na^+$, $Ca^{2+}$, $Mg^{2+}$, $Zn^{2+}$, $Ti^{4+}$ or $Al^{3+}$, with $Ca^{2+}$, $Zn^{2+}$ and $Al^{3+}$ being particularly preferred.

The above-stated salts of hypophosphorous acid are in some cases available commercially, for example under the designation Phoslite® from Italmatch Chemicals.

A further preferred group of phosphorus-containing flame retardants are phosphonates or phosphonic acid diaryl esters of a structure according to the following formula:

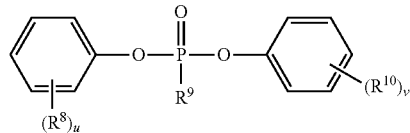

where $R_8$ and $R_{10}$ are H, alkyl, preferably C1-C4 alkyl, $R_9$ is C1-C4 alkyl, u is 1-5 and v is 1-5.

Corresponding structures may also be presented in the form of phosphonate oligomers, polymers and copolymers. Linear or branched phosphonate oligomers and polymers are known from the prior art. References for branched phosphonate oligomers and polymers are the U.S. patents U.S. Pat. Nos. 2,716,101, 3,326,852, 4,328,174, 4,331,614, 4,374,971, 4,415,719, 5,216,113, 5,334,692, 3,442,854, 6,291,630 B1, U.S. Pat. No. 6,861,499 B2 and U.S. Pat. No. 7,816,486 B2. References for phosphonate oligomers are the U.S. patent applications US 2005/0020800 A1, US 2007/0219295 A1 and US 2008/0045673 A1. With regard to linear phosphonate oligomers and polymers, references are the U.S. patent documents U.S. Pat. Nos. 3,946,093, 3,919,363, 6,288,210 B1, U.S. Pat. Nos. 2,682,522 and 2,891,915.

Polymeric and oligomeric phosphonates are available under the trade name Nofia® from FRX Polymers, for example.

A further preferred group of phosphorus-containing flame retardants are compounds based on oxaphosphorine oxide and derivatives thereof with, for example, the following structures:

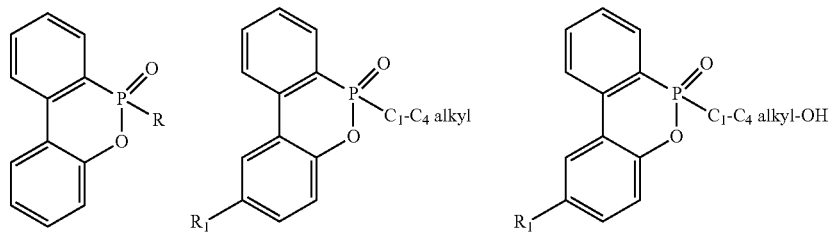

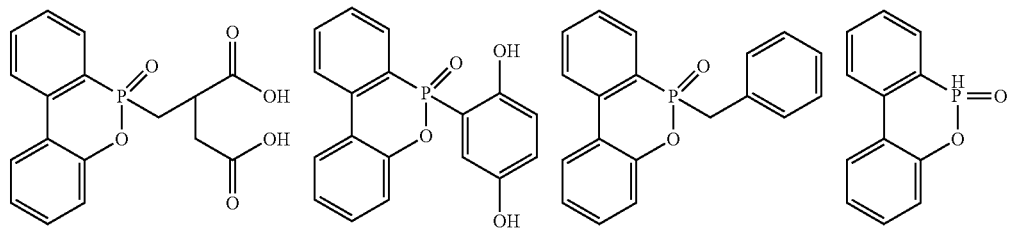

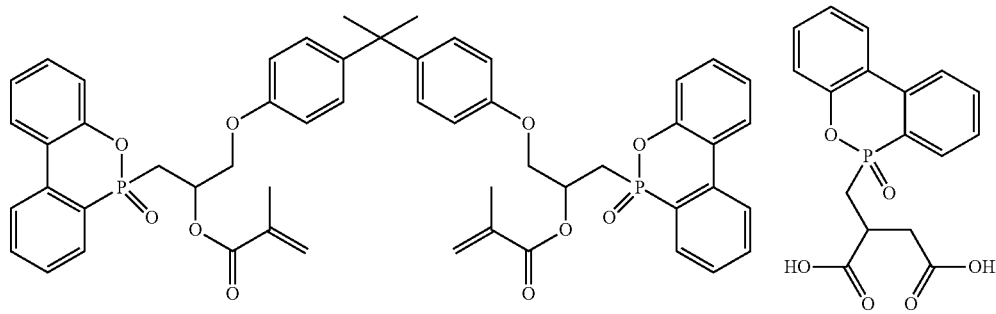

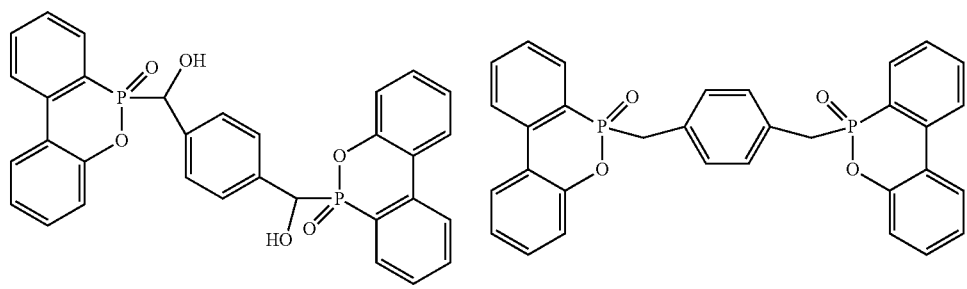

21
-continued
22
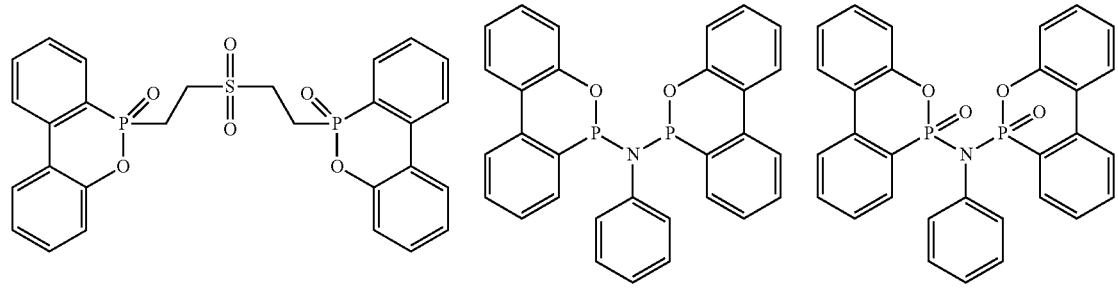
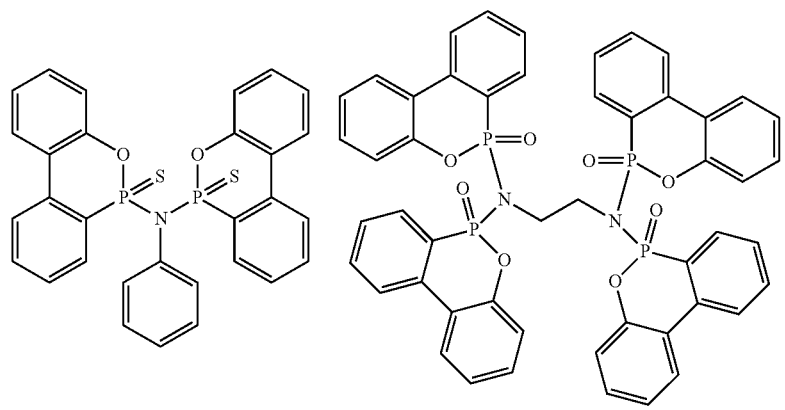
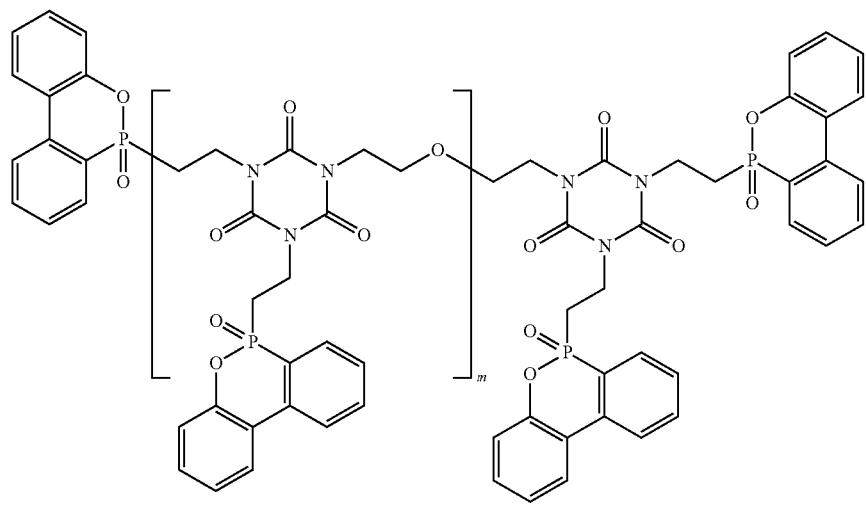
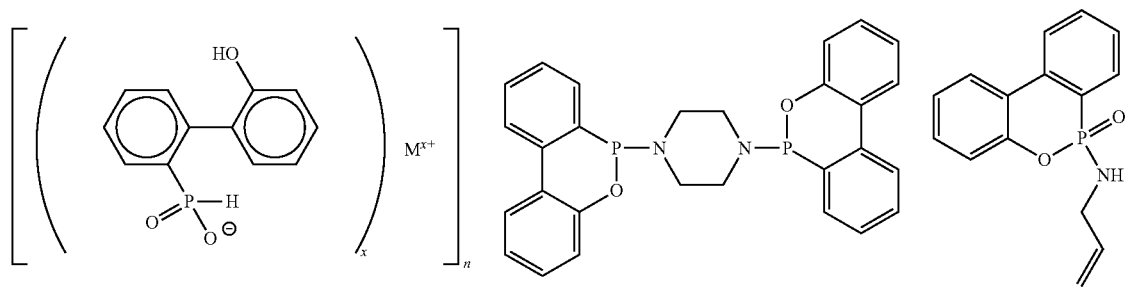

-continued
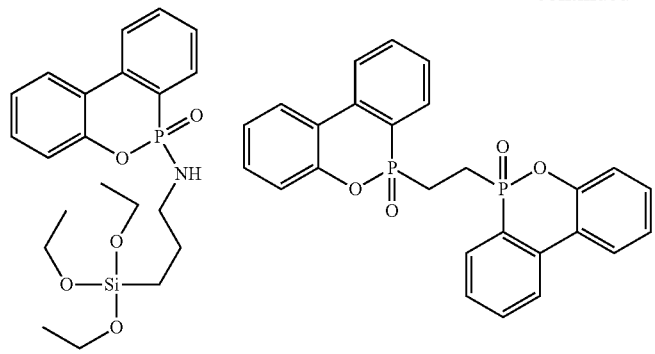
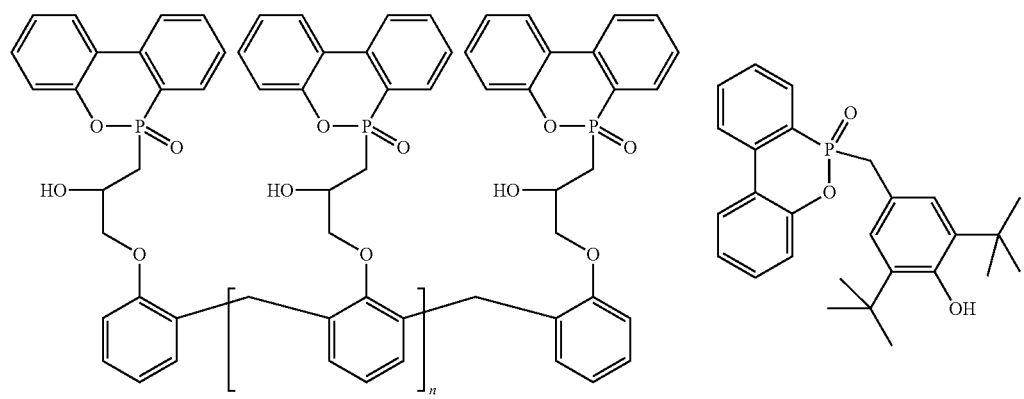
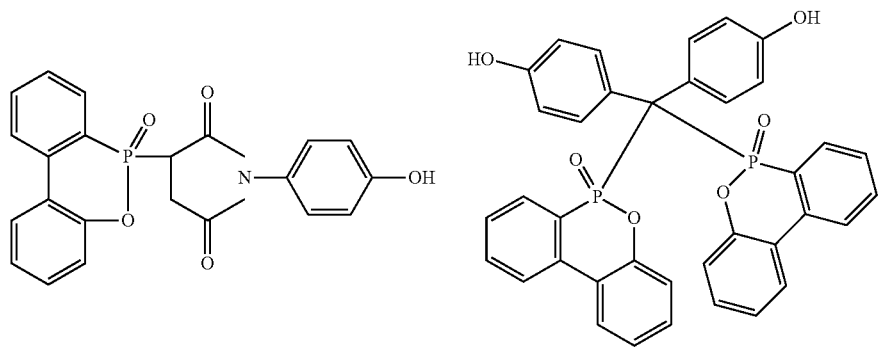
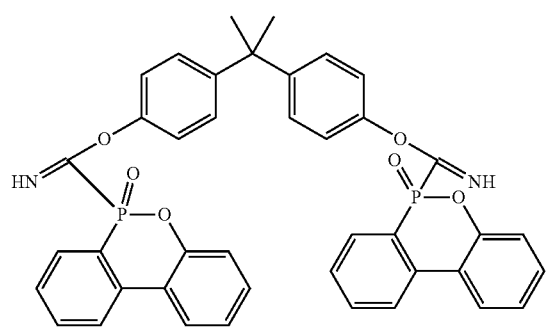
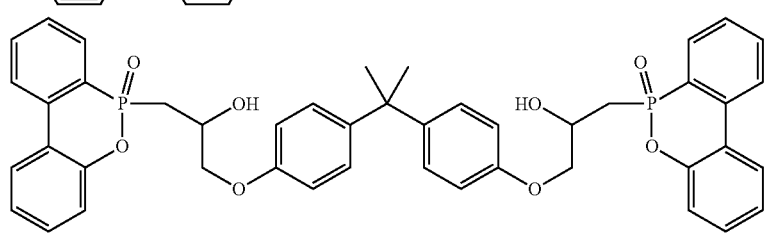

where M is a metal selected from the second, third, twelfth or thirteenth group of the Periodic Table of the Elements, x is 2 or 3, n≥10, m is 0-25, R is H, halogen or an aliphatic or aromatic radical having 1-32 carbon atoms, and $R_1$ is H, C1-C6 alkyl.

Products based on oxophosphorine oxide are in commerce under the trade name Ukanol® from Schill und Seilacher GmbH, for example. Further compounds may be prepared, for example, according to the patent specifications WO 2013020696, WO 2010135398, WO03070736, WO2006084488, WO 2006084489, WO2011000019, WO2013068437, WO2013072295.

Further synergistic, phosphorus-containing flame retardants are cyclic phosphonates or a structure according to one of the following formulae:

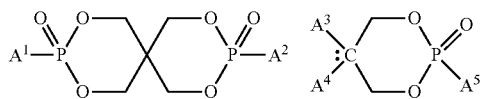

where $A^1$ and $A^2$ independently of one another represent a substituted or unsubstituted, straight-chain or branched alkyl group having 1 to 4 carbon atoms, substituted or unsubstituted benzyl, substituted or unsubstituted phenyl, substituted or unsubstituted naphthyl, and where $A^3$ and $A^4$ independently of one another are methyl or ethyl, and $A^5$ is a straight-chain or branched alkyl group having 1 to 4 carbon atoms or is a phenyl or benzyl group, which may in each case have up to 3 methyl groups.

Cyclic phosphonates are in commerce, for example, from Thor GmbH under the trade name Aflammit®, or may be prepared according to EP 2450401.

Other synergistic, phosphorus-containing flame retardants are phosphacenes, especially polymeric phosphacenes. A corresponding product is in commerce, for example, under the designation SPB-100 from Otsuka Chemicals.

The at least one further flame retardant may in particular also be a nitrogen-containing flame retardant. Preferred nitrogen-containing flame retardants are melamine polyphosphate, melamine cyanurate, melamine metal phosphates, poly[2,4-(piperazin-1,4-yl)-6-(morpholin-4-yl)-1,3,5-triazine] and ammonium polyphosphate. These compounds are commercial products and are available under the trade names Melapur® from BASF SE, Budit® from Budenheim Chemische Fabrik, Exolit AP® from Clariant, Safire® from J.M. Huber Corporation or MCA PPM Triazine from MCA Technologies GmbH.

Especially preferred is the combination of the sulfonic acid derivatives of the invention with a phosphonate and/or with a (poly)phosphazene and/or with a phosphate.

A further preferred composition is the replacement of antimony oxide in halogen-containing flame retardant combinations, i.e., the combination of the sulfonic acid derivatives of the invention with bromine-containing flame retardants.

In another preferred embodiment of the present invention, component (D) is selected from the group consisting of UV absorbers, light stabilizers, UV stabilizers, preferably phenolic, aminic and/or sulfur-containing antioxidants, sterically hindered amines, phosphites, phosphonites, hydroxylamines, benzofuranones, metal deactivators, filler deactivators, nucleating agents, impact tougheners, plasticizers, lubricants, rheological modifiers, processing assistants, pigments, dyes, optical brighteners, active antimicrobial ingredients, antistats, slip agents, antiblocking agents, coupling agents, dispersants, compatibilizers, oxygen scavengers, acid scavengers, taggants or antifogging agents, and mixtures thereof.

Preferred acid scavengers here are selected from the group consisting of salts of long-chain carboxylic acids, especially calcium stearate, magnesium stearate, zinc stearate, calcium lactate, calcium stearoyl-2-lactylate, hydrotalcites.

Suitable light stabilizers are, for example, compounds based on 2-(2'-hydroxyphenyl)benzotriazoles, 2-hydroxybenzophenones, esters of benzoic acids, acrylates, oxamides, and 2-(2-hydroxyphenyl)-1,3,5-triazines.

Suitable 2-(2'-hydroxyphenyl)benzotriazoles are, for example, 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonyl)ethyl)phenyl)-5-chlorobenzotriazole, 2-(3'-tert-butyl-5'-[2-(2-ethyl-hexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazol-2-ylphenol]; the product of transesterification of 2-[3'-tert-butyl-5'-(2-methoxycarbonylethyl)-2'-hydroxyphenyl]-2H-benzotriazole with polyethylene glycol 300; [R—CH2CH2-COO—CH2CH2-]-2, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]benzotriazole, 2-[2'-hydroxy-3'-(1,1,3,3-tetramethylbutyl)-5'-(α,α-dimethylbenzyl)phenyl]benzotriazole.

Suitable 2-hydroxybenzophenones are, for example, 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives of the 2-hydroxybenzophenones.

Suitable acrylates are, for example, ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

Suitable esters of benzoic acids are, for example, 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

Suitable oxamides are, for example, 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixtures with 2-ethoxy-2'-ethyl-5,4'-di-tert-butoxanilide, mixtures of o- and p-methoxy-disubstituted oxanilides, and mixtures of o- and p-ethoxy-disubstituted oxanilides.

Suitable 2-(2-hydroxyphenyl)-1,3,5-triazines are, for example, 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl-1,3,5-triazine.

Suitable phenolic antioxidants are, for example:

alkylated monophenols, such as, for example, 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-($\alpha$-methylcyclohexyl)-4,6-dimethylphenol, 2,6-dioctadecyl-4-methylphenol, 2,4,6-tricyclohexylphenol, 2,6-di-tert-butyl-4-methoxymethylphenol, linear or branched nonylphenols, such as, for example, 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol, and mixtures thereof;

alkylthiomethylphenols, such as, for example, 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol;

hydroquinones and alkylated hydroquinones, such as, for example, 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxylphenyl) adipate; tocopherols, such as, for example, $\alpha$-, $\beta$-, $\gamma$-, $\delta$-tocopherol and mixtures of these (vitamin E);

hydroxylated thiodiphenyl ethers, such as, for example, 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide; alkylidenebisphenols, such as, for example, 2,2'-methylenebis(6-tert-butyl-4-methylphenol), 2,2'-methylenebis(6-tert-butyl-4-ethylphenol), 2,2'-methylenebis[4-methyl-6-($\alpha$-methylcyclohexyl)phenol], 2,2'-methylenebis(4-methyl-6-cyclhexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-($\alpha$-methylbenzyl)-4-nonylphenol], 2,2'-methylenebis[6-($\alpha,\alpha$-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)-dicyclopentadiene, bis[2-(3'-tert-butyl-2'-hydroxy-5'-methylbenzyl)-6-tert-butyl-4-methylphenyl] terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane;

O-, N- and S-benzyl compounds, such as, for example, 3,5,3',5'-tetra-tert-butyl-4,4'-dihydroxydibenzyl ether, octadecyl 4-hydroxy-3,5-dimethylbenzylmercaptoacetate, tridecyl 4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl) sulfide, isooctyl 3,5-di-tert-butyl-4-hydroxybenzylmercaptoacetate;

hydroxybenzylated malonates, such as, for example, dioctadecyl 2,2-bis(3,5-di-tert-butyl-2-hydroxybenzyl)malonate, dioctadecyl 2-(3-tert-butyl-4-hydroxy-5-methylbenzyl)malonate, didodecylmercaptoethyl 2,2-bis(3,5-di-tert-butyl-4-hydroxybenzyl)malonate, bis[4-(1,1,3,3-tetramethylbutyl)phenyl] 2,2-bis(3,5-di-tert-butyl-4-hydroxybenzyl)malonate;

aromatic hydroxybenzyl compounds, such as, for example, 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol;

triazine compounds, such as, for example, 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroyphenylpropionyl)hexahydro-1,3,5-triazine, 1,3,5-tris(3,5-dicyclohexyl-4-hydroxybenzyl) isocyanurate;

benzylphosphonates, such as, for example, dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzylphosphonate, the calcium salt of the monoethyl ester of 3,5-di-tert-butyl-4-hydroxybenzylphosphonic acid;

acylaminophenols, such as, for example, 4-hydroxylauranilide, 4-hydroxystearanilide, octyl N-(3,5-di-tert-butyl-4-hydroxyphenyl)carbamate;

esters of $\beta$-(3,5-di-tert-butyl-4-hydroxyphenyl)propionic acid with mono- or polyhydric alcohols, e.g., methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

esters of β-(5-tert-butyl-4-hydroxy-3-methylphenyl)propionic acid with mono- or polyhydric alcohols, e.g., methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, 3,9-bis[2-{3-(3-tert-butyl-4-hydroxy-5-methylphenyl)propionyloxy}-1,1-dimethylethyl]-2,4,8,10-tetraoxaspiro[5.5]undecane;

esters of β-(3,5-dicyclohexyl-4-hydroxyphenyl)propionic acid with mono- or polyhydric alcohols, e.g., methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

esters of (3,5-di-tert-butyl-4-hydroxyphenyl)acetic acid with mono- or polyhydric alcohols, e.g., methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

amides of β-(3,5-di-tert-butyl-4-hydroxyphenyl)propionic acid, such as, for example, N,N'-bis(3,5-di-tert-butyl-4-hydroxyphenylpropionyl)hexamethylenediamide, N,N'-bis(3,5-di-tert-butyl-4-hydroxyphenylpropionyl)hexamethylenediamide, N,N'-bis(3,5-di-tert-butyl-4-hydroxyphenylpropionyl)hexamethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide; ascorbic acid (vitamin C).

Particularly preferred phenolic antioxidants are the following structures:

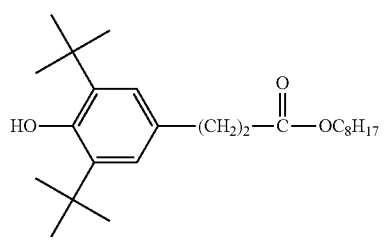

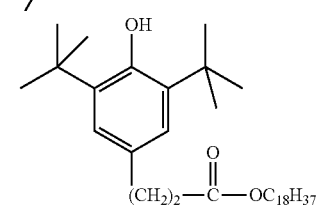

-continued

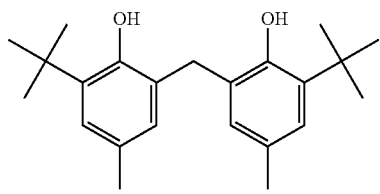

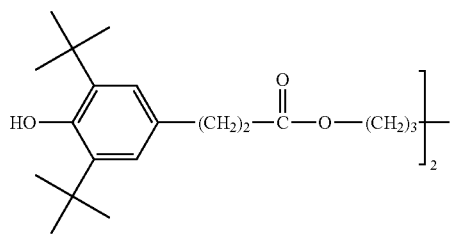

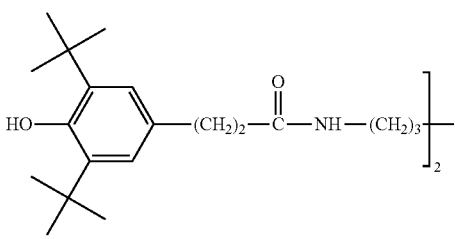

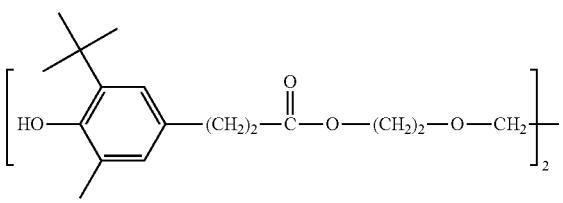

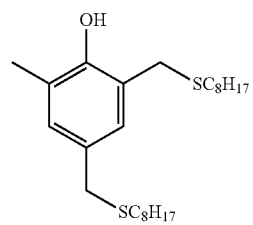

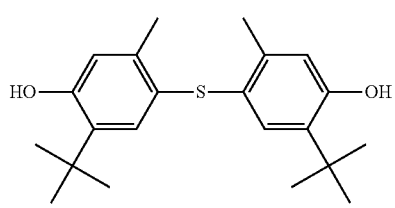

31
-continued
32
-continued
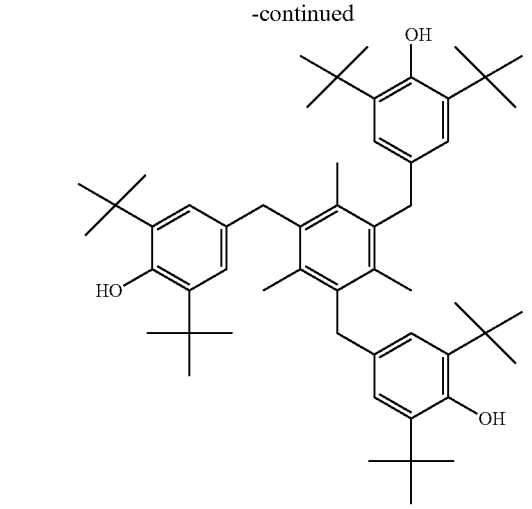
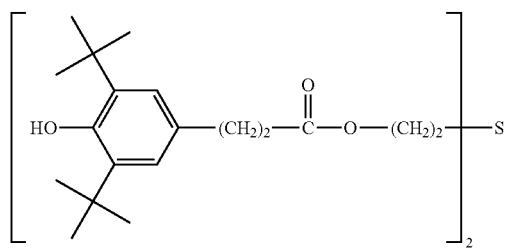
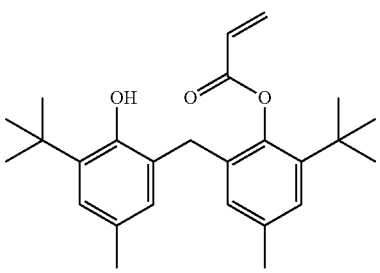
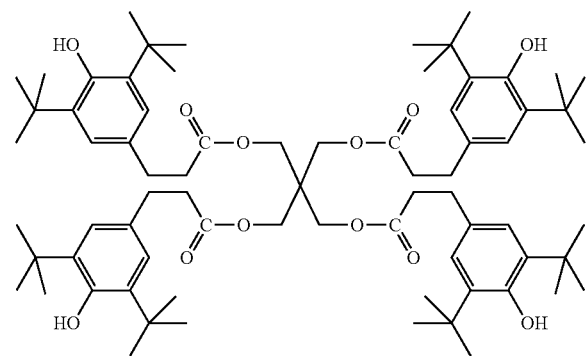
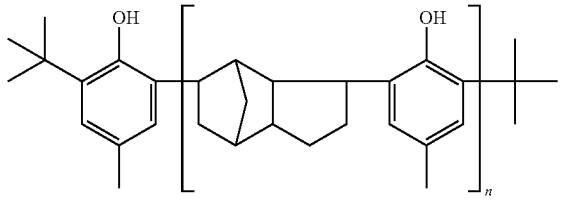
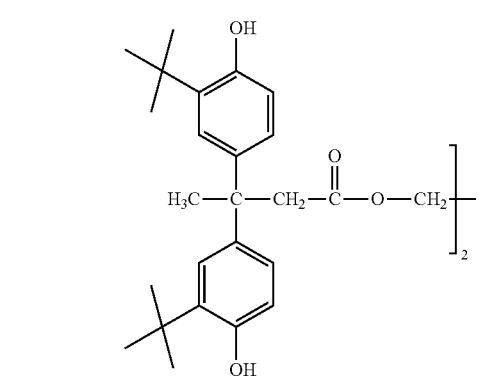
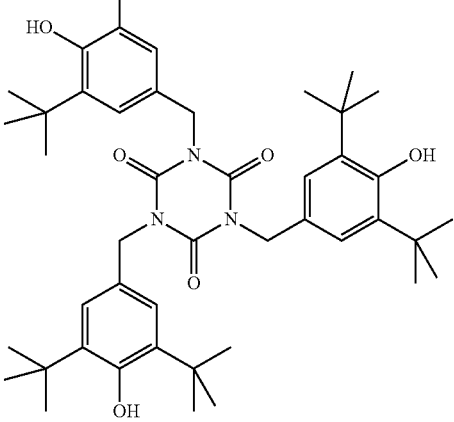
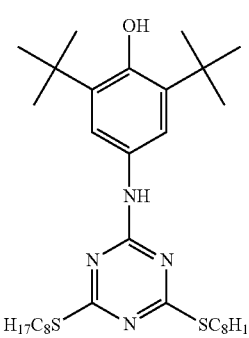
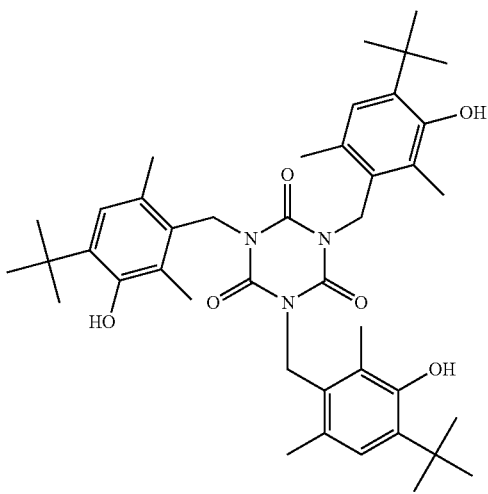

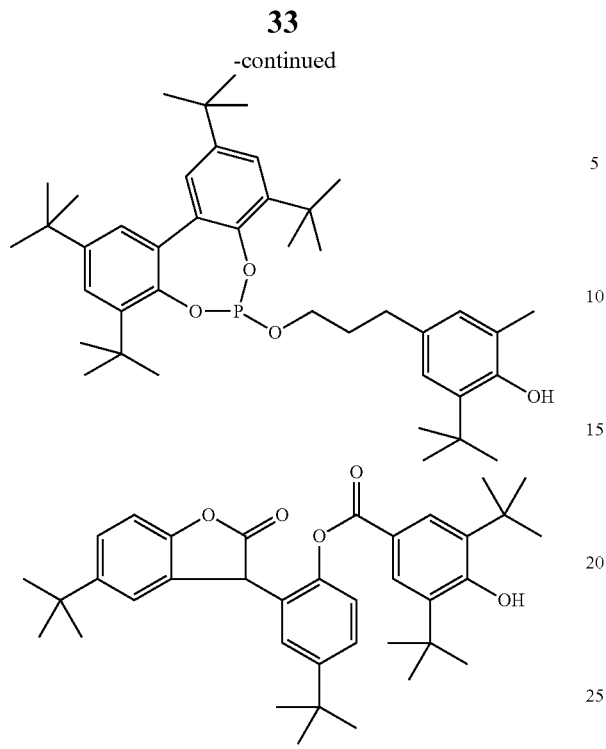

Suitable phosphites/phosphonites are, for example: triphenyl phosphite, diphenyl alkyl phosphites, phenyl dialkyl phosphites, tri(nonylphenyl) phosphite, trilauryl phosphites, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,4-dicumylphenyl) pentaerythritol diphosphite, bis(2,6-di-tert-butyl-4-methylphenyl) pentaerythritol diphosphite, diisodecyloxy pentaerythritol diphosphite, bis(2,4-di-tert-butyl-6-methylphenyl) pentaerythritol diphosphite, bis(2,4,6-tris(tert-butylphenyl) pentaerythritol diphosphite, tristearyl sorbitol triphosphite, tetrakis(2,4-di-tert-butylphenyl)-4,4'-biphenylenediphosphonite, 6-isooctyloxy-2,4,8,10-tetra-tert-butyl-12H-dibenzo[d,g]-1,3,2-dioxaphosphocine, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenzo[d,g]-1,3,2-dioxaphosphocine, 2,2'2"-nitrilo[triethyl tris(3,3",5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl) phosphite, 5-butyl-5-ethyl-2-(2,4,6-tri-tert-butylphenoxy)-1,3,2-dioxaphosphirane.

Further suitable phosphites are the commercial products Weston 705 (manufacturer: Addivant) and Doverphos LGP 11 (manufacturer: Dover Chemical Corporation), these being liquid phosphites.

Particularly preferred phosphites/phosphonites are:

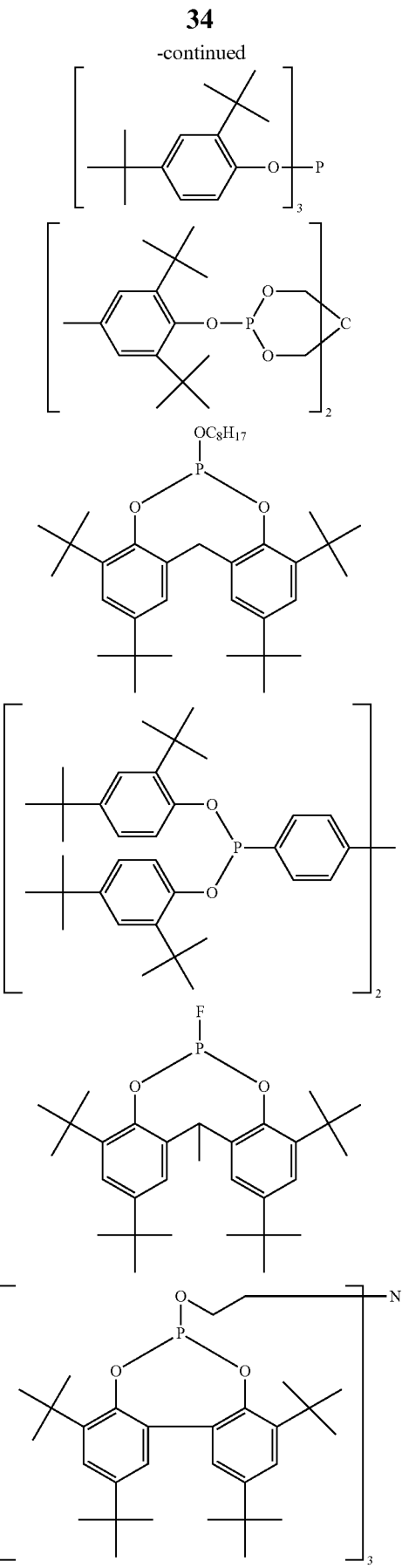

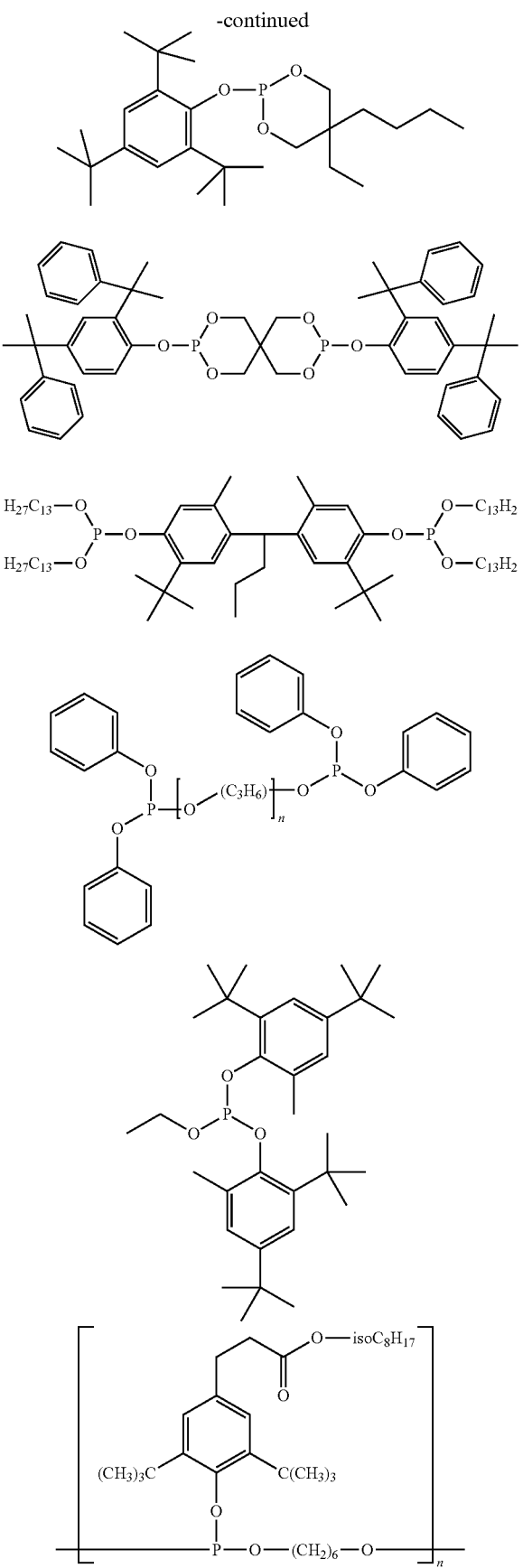

Suitable aminic antioxidants are, for example: N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, e.g., p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetra-methyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyl-diphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, and also mixtures or combinations thereof.

Further suitable aminic antioxidants are hydroxylamines or N-oxides (nitrones), such as, for example, N,N-dialkylhydroxylamines, N,N-bibenzylhydroxylamine, N,N-dilaurylhydroxylamine, N,N-distearylhydroxylamine, N-benzyl α-phenyl nitrone, N-octadecyl α-hexadecyl nitron, and also Genox EP (Addivant) according to the formula:

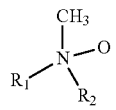

Genox EP
$R_1, R_2 = C_{14}\text{-}C_{24}$ Alkyl

Further suitable stabilizers are thiosynergists. Suitable thiosynergists are, for example, distearyl thiodipropionate, dilauryl thiodipropionate, or the compound according to the following formula:

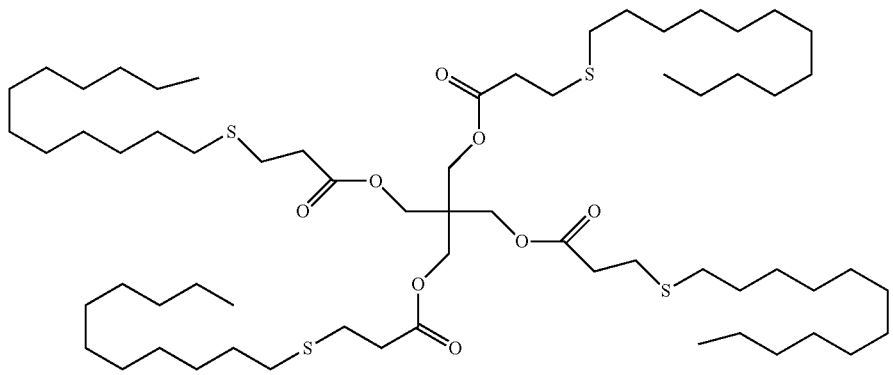 [SMILES: CCCCCCCCCCCCSCCC(=O)OCC(COC(=O)CCSCCCCCCCCCCC)(COC(=O)CCSCCCCCCCCCCCC)COC(=O)CCSCCCCCCCCCCCC]

Further suitable stabilizers, especially for polyamides, are copper salts such as, for example, copper(I) iodide, copper(I) bromide or copper complexes such as, for example, triphenylphosphine-copper(I) complexes.

Suitable hindered amines are, for example, 1,1-bis(2,2,6,6-tetramethyl-4-piperidyl) succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensation product of 1-(2-hydroxyethyl)-2,2,6,6-tetramethyl-4-hydroxypiperidine and succinic acid, linear or cyclic condensation products of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl) 1,2,3,4-butanetetracarboxylate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, linear or cyclic condensation products of N,N'-bis(2,2,6,6-tetramethyl-4-piperidyl)hexamethylenediamine and 4-morpholino-2,6-dichloro-1,3,5-triazine, the reaction product of 7,7,9,9-tetramethyl-2-cycloundecyl-1-oxa-3,8-diaza-4-oxospiro[4.5]decane and epichlorohydrin.

Preferred hindered amines additionally have the following structures:

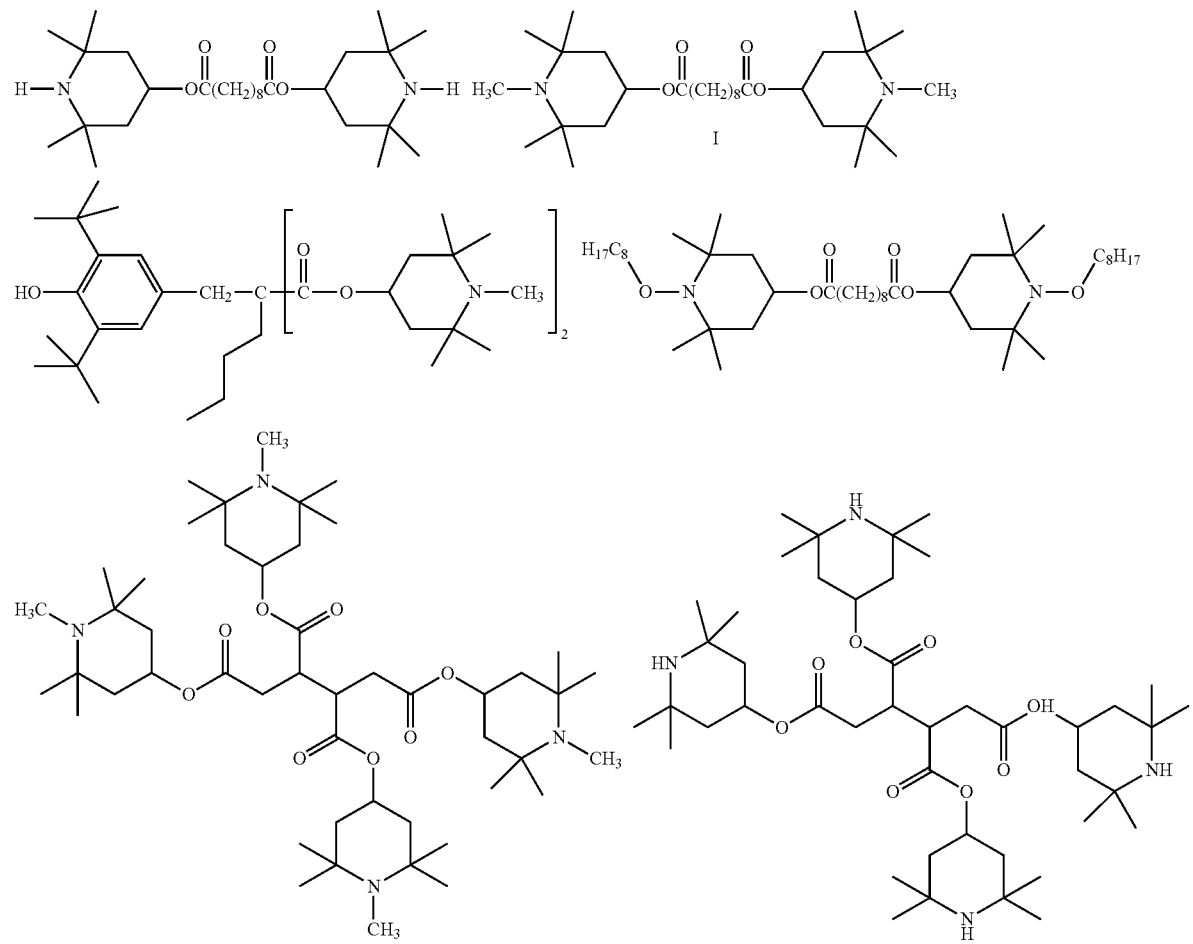

-continued
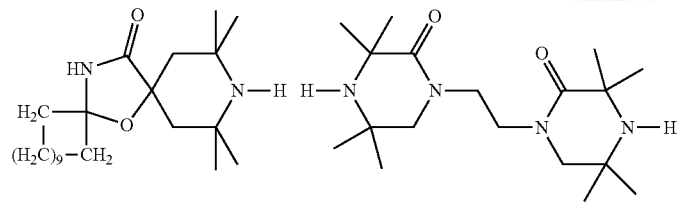
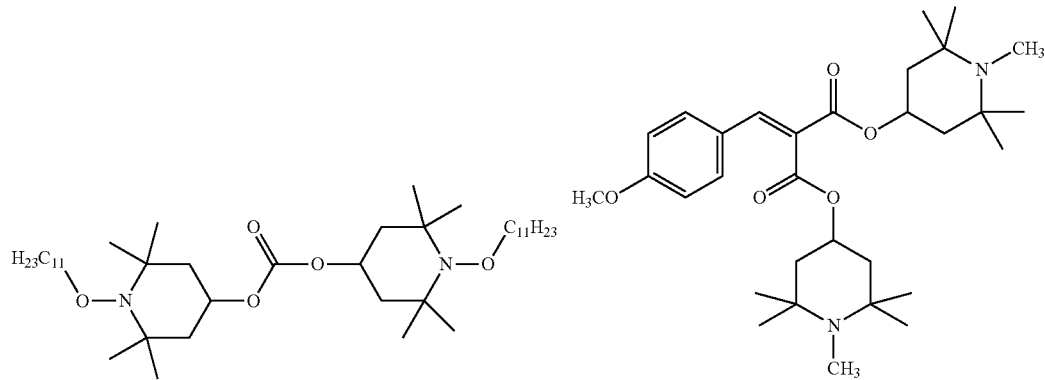
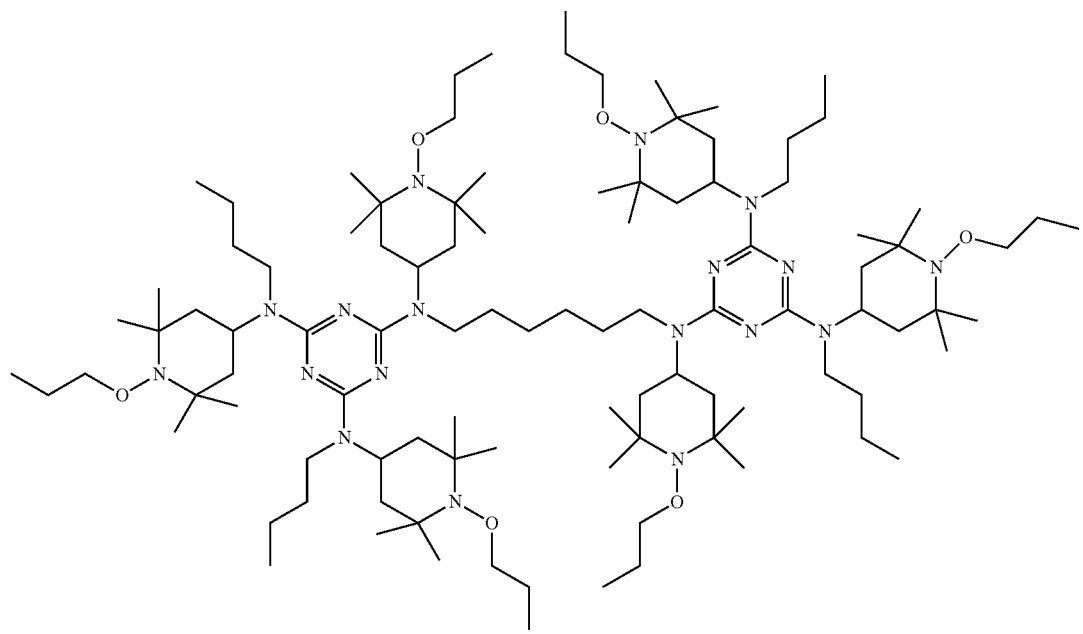
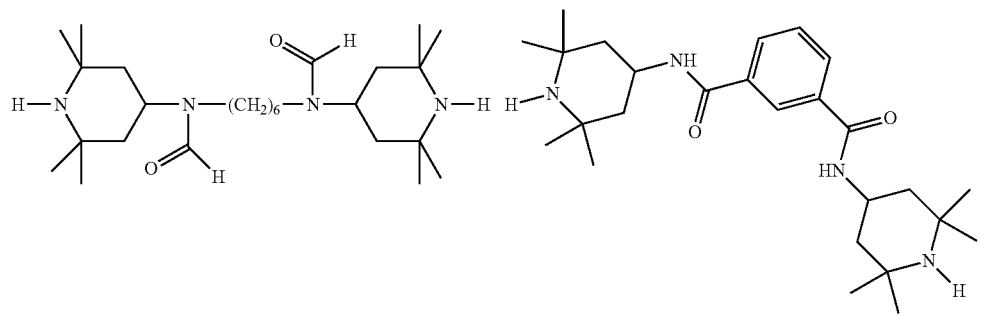

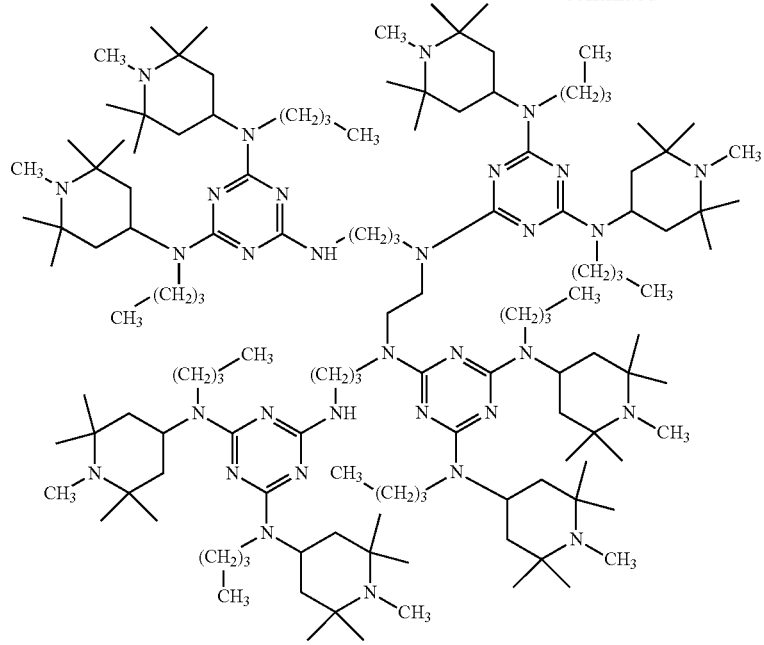
Preferred oligomeric and polymeric hindered amines have the following structures:
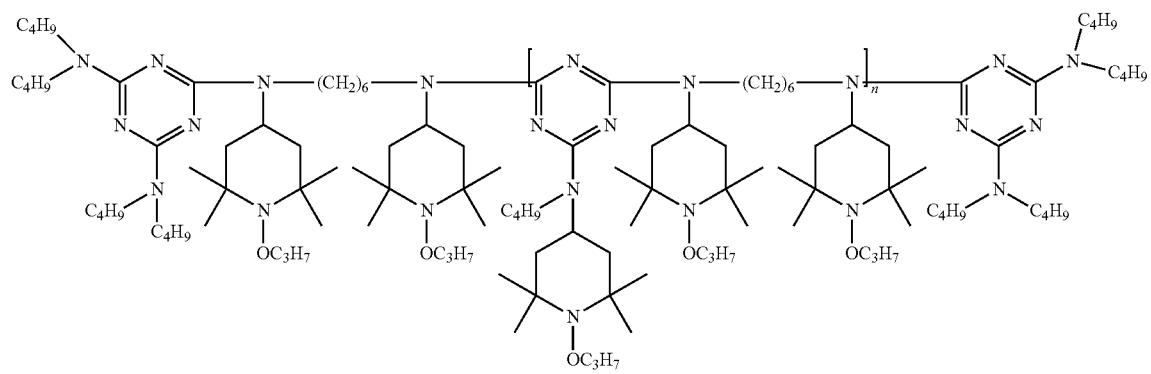
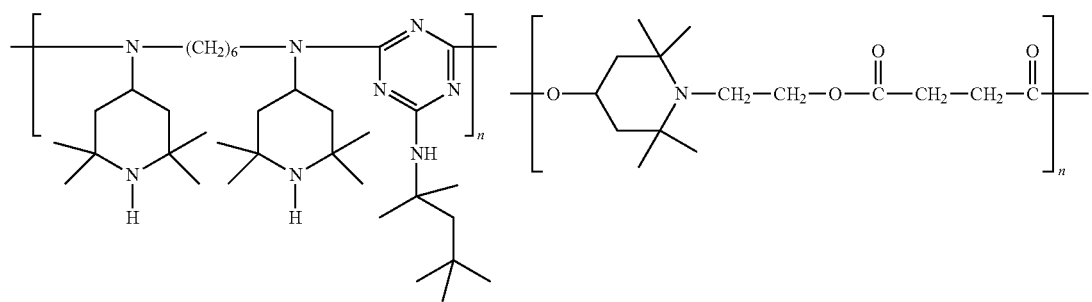

-continued
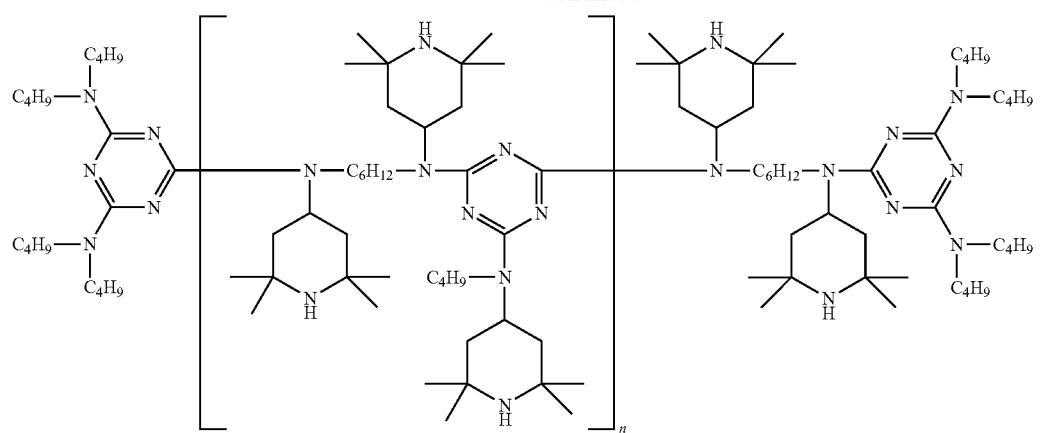
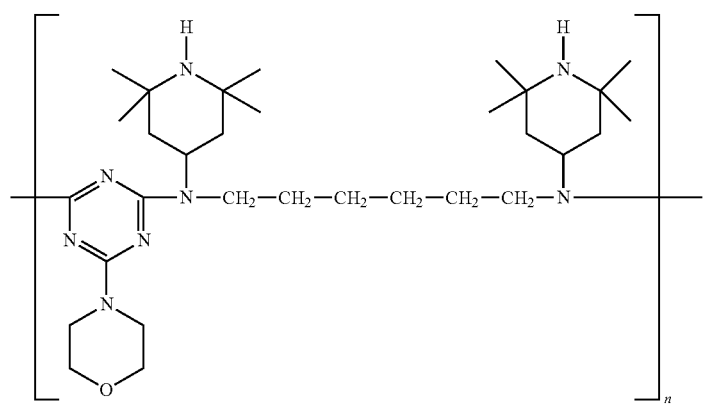
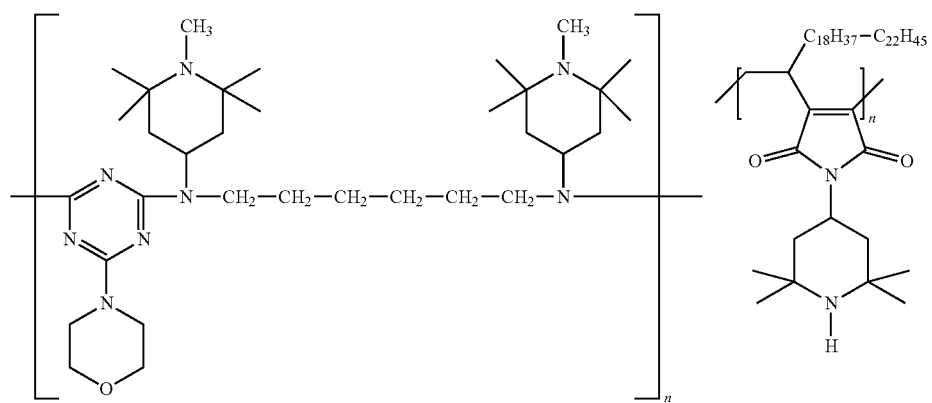

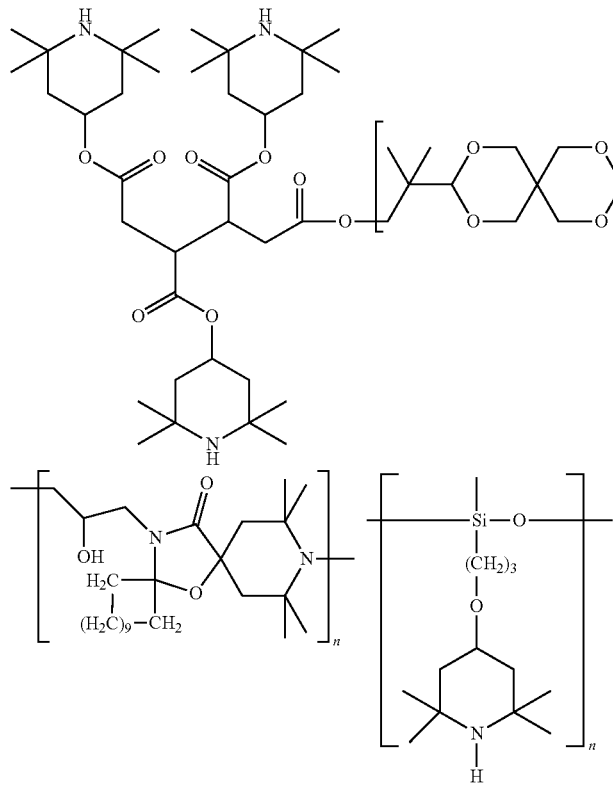

Suitable lactones are, for example: 5,7-di-tert-butyl-3-(3,4-dimethylphenyl)-3H-benzofuran-2-one, 5,7-di-tert-butyl-3-[-4-(2-stearoyloxyethoxy)phenyl]-benzofuran-2-one, 3-(4-acetoxy-3,5-dimethylphenyl)-5,7-di-tert-butyl-benzofuran-2-one), and also phosphorus-containing 3-phenylbenzofuran-2-ones.

Suitable metal deactivators are, for example, N,N'-diphenyloxamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyl adipoyldihydrazide, N,N'-bis(salicyloyl)oxylyl dihydrazide, N,N'-bis(salicyloyl)thiopropionyl dihydrazide.

Suitable dispersants are, for example:
polyacrylates, e.g., copolymers with long-chain side groups, polyacrylate block copolymers, alkylamides: e.g., N,N'-1,2-ethanediylbisoctadecanamide, sorbitan esters, e.g., monostearyl sorbitan esters, titanates and zirconates, reactive copolymers with functional groups, e.g., polypropylene-co-acrylic acid, polypropylene-co-maleic anhydride, polyethylene-co-glycidyl methacrylate, polystyrene-alt-maleic anhydride-polysiloxanes: e.g., dimethylsilanediol-ethylene oxide copolymer, polyphenylsiloxane copolymer, amphiphilic copolymers: e.g., polyethylene-block-polyethylene oxide, dendrimers, e.g., hydroxyl-containing dendrimers.

Suitable nucleating agents are, for example, talc, alkali metal or alkaline earth metal salts of mono- and polyfunctional carboxylic acids such as, for example, benzoic acid, succinic acid, adipic acid, examples being sodium benzoate, zinc glycerolate, aluminum hydroxybis(4-tert-butyl)benzoate, benzylidenesorbitols such as, for example, 1,3:2,4-bis(benzylidene)sorbitol or 1,3:2,4-bis(4-methylbenzylidene)sorbitol, 2,2'-methylenebis(4,6-di-tert-butylphenyl) phosphate, and also trisamides and diamides such as, for example, trimesic acid tricyclohexyl amide, trimesic acid tri(4-methylcyclohexyl amide), trimesic acid tri(tert-butyl amide), N,N',N"-1,3,5-benzenetriyltris(2,2-dimethylpropanamide) or 2,6-naphthalenedicarboxylic acid dicyclohexyl amide.

Suitable antinucleating agents are, for example, azine dyes such as, for example, nigrosine, ionic liquids and/or lithium salts.

Suitable fillers and reinforcing agents are, for example, synthetic or natural materials, such as, for example, calcium carbonate, silicates, glass fibers, glass beads (solid or hollow), talc, mica, kaolin, barium sulfate, metal oxides and metal hydroxides, carbon black, graphite, carbon nanotubes, graphene, wood flour or fibers of natural products such as, for example, cellulose or synthetic fibers. Further suitable fillers are hydrotalcites or zeolites or phyllosilicates such as, for example, montmorillonite, bentonite, beidelite, mica, hectorite, saponite, vermiculite, ledikite, magadite, illite, kaolinite, wollastonite, attapulgite, halloysite.

Suitable pigments may be inorganic or organic in nature. Inorganic pigments are, for example, titanium dioxide, zinc oxide, zinc sulfide, iron oxide, ultramarine, carbon black; organic pigments are, for example, anthraquinones, anthanthrones, benzimidazolones, quinacridones, diketopyrrolopyrroles, dioxazines, indanthrones, isoindolinones, azo compounds, perylenes, phthalocyanines or pyranthrones. Other suitable pigments are effect pigments based on metal, or pearlescent pigments based on metal oxide.

Suitable chain extenders for the linear increase in molecular weight of polycondensation polymers such as polyesters or polyamides are, for example, diepoxides, bisoxazolines, bisoxazolones, bisoxazines, diisocyanates, dianhydrides, bisacyllactams, bismaleimides, dicyanates, (poly)carbodiimides. Further suitable chain extenders are polymeric compounds such as, for example, polystyrene-polyacrylate-polyglycidyl (meth)acrylate copolymers, polystyrene-maleic anhydride copolymers and polyethylene-maleic anhydride copolymers.

Suitable optical brighteners are, for example, bisbenzoxazoles, phenylcoumarins or bis(styryl)biphenyls and, in particular, optical brighteners of the formulae:

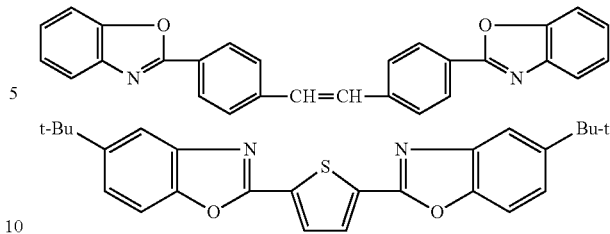

Suitable filler deactivators are, for example, polysiloxanes, polyacrylates, especially block copolymers such as polymethacrylic acid-polyalkylene oxide or polyglycidyl (meth)acrylates and copolymers thereof, for example, with styrene, and also epoxides, for example, of the following structures:

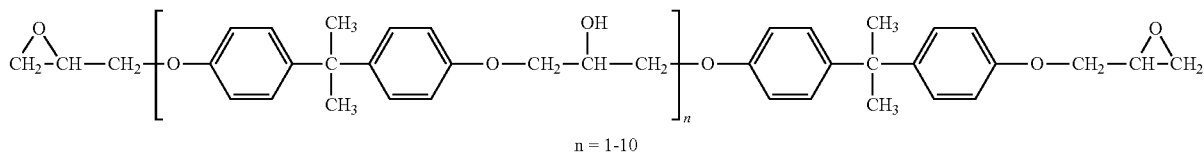

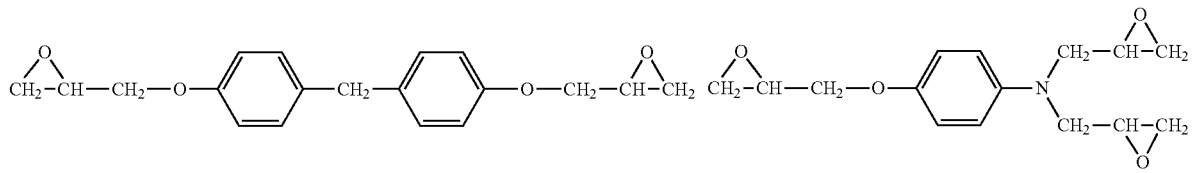

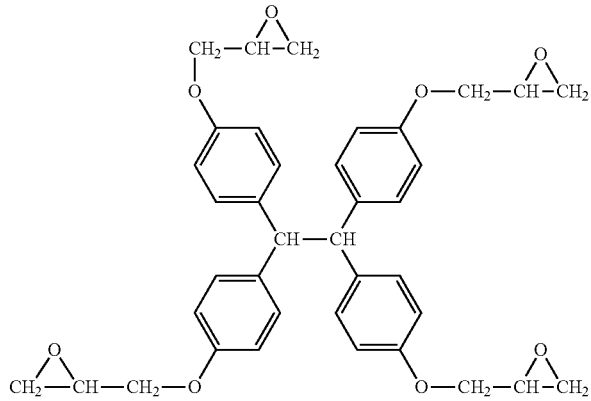

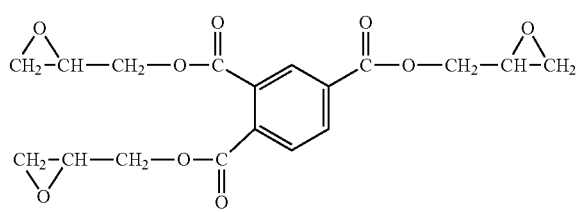

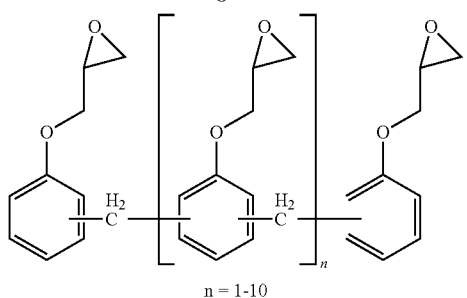

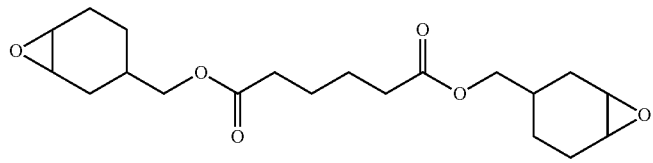

Suitable antistats are, for example, ethoxylated alkylamines, fatty acid esters, alkylsulfonates, and polymers such as, for example, polyetheramides.

Suitable antiozonants are the above-stated amines such as, for example, N,N'-diisopropyl-p-phenylenediamine, N,N'-di-sec-butyl-p-phenylenediamine, N,N'-bis(1,4-dimethylpentyl)-p-phenylenediamine, N,N'-dicyclohexyl-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine.

Suitable mold release assistants are, for example, montan waxes.

Suitable plastics for the purposes of the present invention have been described above.

According to another preferred embodiment of the present invention, component (A) is present in the plastics composition at 60 to 99 wt %, preferably 60 to 95 wt % and more preferably at 60 to 90 wt %, based on the total weight of the flame-retarded plastics composition.

In another preferred embodiment of the invention, component (B) is present in the flame-retarded plastics composition at 0.5 to 15 wt %, preferably 1.0 to 12 wt % and more preferably at 2 to 10 wt %, based on the total weight of said composition.

In another preferred embodiment of the present invention, component (C) is present in the flame-retarded plastics composition at 1 to 60 wt %, preferably 2 to 30 wt % and more preferably at 5 to 25 wt %, based on the total weight of said composition.

In another preferred embodiment of the present invention, component (D) is present in the flame-retarded plastics composition at 0.05 to 50 wt %, preferably 0.1 to 40 wt % and more preferably at 0.2 to 30 wt % or 0.1 to 1 wt %, based on the total weight of said composition.

In a further preferred embodiment of the present invention, component (A) is present in the plastics composition at 60 to 99 wt %, preferably 60 to 95 wt % and more preferably at 60 to 90 wt %, based on the total weight of the flame-retarded plastics composition, and component (B) is present in the flame-retarded plastics composition at 0.5 to 15 wt %, preferably 1.0 to 12 wt % and more preferably at 2 to 10 wt %, based on the total weight of said composition, and component (C) is present in the flame-retarded plastics composition at 1 to 60 wt %, preferably 2 to 30 wt % and more preferably at 5 to 25 wt %, based on the total weight of said composition, and component (D) is present in the flame-retarded plastics composition at 0.05 to 50 wt %, preferably 0.1 to 40 wt % and more preferably at 0.2 to 30 wt % or 0.1 to 1 wt %, based on the total weight of said composition.

Uses

Use as Radical Generator

A further aspect of the present invention relates to the use of the above-defined halogen-free sulfonic acid azanyl esters and/or halogen-free sulfinic acid azanyl esters as radical generators for modifying plastics.

A preferred embodiment of the present invention relates to the following modifications of the plastics:
- the molecular weight of the plastics is increased; and/or
- branching or crosslinking of the plastics takes place; and/or
- the molecular weight of the plastics is reduced; and/or
- the molecular weight distribution of the plastics is influenced; and/or
- unsaturated monomers are grafted onto the plastics.

It is further preferred here for the use to take place in one of the above-specified plastics a) to o) or mixtures thereof.

Controlled Degradation of Polyolefins

The method of the invention for the controlled degradation of polyolefins comprises the following steps:
I. providing at least one halogen-free sulfonic ester and/or at least one halogen-free sulfinic ester;
II. providing at least one degradable polyolefin;
III. contacting and melting the compounds provided in steps I. and II.;
IV. heating the melt from step III. for more than one minute.

According to a preferred embodiment of the method for controlled degradation of polyolefins, the at least one halogen-free sulfonic ester and/or at least one halogen-free sulfinic ester provided in step I. is one of the compounds defined above.

It is preferred, moreover, if the temperature during steps III. and IV. is selected such that the half-life of the at least one halogen-free sulfonic ester and/or at least one halogen-free sulfinic ester is less than 2 minutes and preferably less than 1 minute.

It is also preferred if step IV. is carried out for more than 2 minutes, preferably for 2 to 10 minutes.

Preferred melting temperatures are in the range from 180 to 280° C., particular preference being given to 200 to 250° C.

The method is especially preferred for the controlled degradation of polypropylene and for the production of CRPP (controlled rheology polypropylene).

Crosslinking of Polyolefins

The method of the invention for crosslinking polyolefins comprises the following steps:
(1) providing at least one halogen-free sulfonic ester and/or at least one halogen-free sulfinic ester;
(2) providing at least one degradable polyolefin;
(3) contacting and melting the compounds provided in steps (1) and (2);
(4) heating the melt from step (3) for more than one minute.

According to one preferred embodiment of the method for crosslinking polyolefins, the method comprises a further step (5), which is performed before or during step (4) and provides for the addition of a crosslinking additive selected from the group consisting of triallyl isocyanurate, trisoallyl cyanurate, diallyl terephthalate, polyfunctional acrylates and methacrylates, especially trimethylolpropane trimethacrylate, and mixtures thereof.

According to one preferred embodiment of the method for crosslinking polyolefins, the at least one halogen-free sulfonic ester and/or at least one halogen-free sulfinic ester provided in step (1) is one of the compounds defined above.

It is preferred, moreover, if the temperature during steps (3) and (4) is selected such that the half-life of the at least one halogen-free sulfonic ester and/or at least one halogen-free sulfinic ester is less than 2 minutes and preferably less than 1 minute.

It is preferred, moreover, if step (4) is carried out for more than 2 minutes, preferably for 2 to 10 minutes.

Preferred melting temperatures are in the range from 180 to 280° C.; particular preference is given to 200 to 250° C.

Grafting of Polyolefins

The method of the invention for grafting polyolefins comprises the following steps:
a. providing at least one halogen-free sulfonic ester and/or at least one halogen-free sulfinic ester;
b. providing at least one degradable polyolefin;

c. providing at least one monomer which has a graftable group;

d. contacting and melting the compounds provided in steps a. to c.;

e. heating the melt from step d. for more than one minute.

According to one preferred embodiment of the method for grafting polyolefins, the at least one halogen-free sulfonic ester and/or at least one halogen-free sulfinic ester provided in step a. is one of the compounds defined above.

It is preferred, furthermore, for the temperature during steps c. and d. to be selected such that the half-life of the at least one halogen-free sulfonic ester and/or at least one halogen-free sulfinic ester is less than two minutes and preferably less than one minute It is preferred, moreover, if step d. is carried out for more than 2 minutes, preferably for 2 to 10 minutes.

The monomer in step c. is selected such that it has little or no volatility at the processing temperature.

It is preferred, moreover, for the monomer in step c. to be selected from the group consisting of maleic anhydride, itaconic anhydride, acrylic acid, (meth)acrylic esters, and mixtures thereof.

Preferred melting temperatures are in the range from 180 to 280° C.; particular preference is given to 200 to 250° C.

In principle the compounds of the invention can be introduced in various forms into the polymer or into the polymer melt—for example, in the form of powder, granules, solution, dispersion, emulsion or flakes. Preferably the compound of the invention is mixed with the polymer or plastics mixture, and the polymer matrix is converted to the melt and subsequently cooled. As an alternative to this, it is also possible to introduce the compound in a liquid melt state into a polymer melt.

Where further constituents are added to the polymer composition, they may be added separately, in the form of liquids, dispersions, emulsions, powders, granules or compacted products, or together with the additive composition of the invention, as described above, to the polymers.

The above-described compounds of the invention and optionally the additional additives are incorporated into the plastic by customary processing techniques, where the polymer is melted and mixed with the compound of the invention and the optional further adjuvants, preferably by means of mixers, compounders and extruders. Preferred processing machinery comprises extruders such as, for example, single-screw extruders, twin-screw extruders, planetary roller extruders, annular extruders, co-compounders, which are equipped preferably with vacuum venting. The processing here may take place under air or optionally under inert gas conditions such as under nitrogen, for example.

Moreover, the compounds of the invention may be produced and introduced in the form of what are called masterbatches or concentrates, which contain, for example, 10-90% of the compositions of the invention in a polymer.

The polymers comprising the compounds of the invention described here may be used for producing shaped articles, extruded items, rotomoldings, injection moldings, blow moldings, single-layer and multilayer films, extruded profiles, tapes, fibers, filaments, foams, surface coatings, and the like.

Applications

Another aspect of the present invention relates to the uses of a flame-retarded plastics composition of the invention in the electrical or electronics industry, mechanical engineering and apparatus construction, building industry, transport industry, preferably automobiles, aircraft, railroad and ships, for cables, for medical applications, for household appliances, vehicle parts, consumer goods, packaging, furniture, and textiles.

Examples of applications are automotive parts, e.g.: fenders, dashboards, engine parts, airbags, front and rear light lenses, trim parts for interior and exterior, such as door linings, interior and exterior mirrors, plastic fuel tanks, motorcycle applications, marine applications such as boat parts, deck planks, aircraft parts and railroad parts such as, for example, seats and seat liners, parts for space vehicles and satellites, (roofing) membranes and foams for building applications, road construction such as, for example, street posts, housing parts for televisions, telephones, cellphones, printers, computers, switches, electronic parts such as plugs, circuit boards, data storage, household appliances such as washing machines, dryers, microwave appliances, dishwashers, refrigerators, coffee machines, vacuum cleaners, food mixers, and irons, cable applications, technical articles of any kind such as pegs, screws, parts for solar installations and for wind energy, pipes for drinking water, wastewater and heating, profiles for windows, pipe connecting elements ("fittings"), shower cabinets, wall coverings, decorative foils, curtains, carpets, films and panels for glasshouses, wood substitute, artificial turf, roofing shingles, bricks, stadium seats, floors, furniture parts such as hinges, hygiene articles such as, for example, toothbrushes, diapers, clothing, cables, staple fibers, membranes, geomembranes, transport and storage systems such as boxes, crates, and containers, bottles for beverages, cleaning products, etc.

The present invention is elucidated in more detail with the exemplary embodiments which follow, without the invention being confined to the specific parameters represented therein.

EXPERIMENTAL SECTION

Preparation of the Inventive Flame Retardants

Compound A: 1H-Isoindole-1,3(2H)-dione, 2-[[(4-methylphenyl)sulfonyl]oxy]

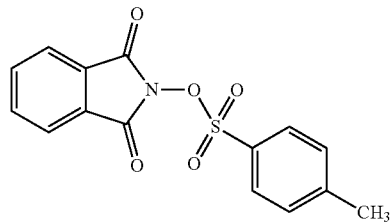 [SMILES: Cc1ccc(S(=O)(=O)ON2C(=O)c3ccccc3C2=O)cc1]

A baked triple-neck flask is charged with 16.028 g of N-hydroxyphthalimide (98.25 mmol), 20.576 g of para-toluenesulfonyl chloride (107.9 mmol) and 320 mL of dichloromethane. Under a nitrogen atmosphere, 16 mL of pyridine are added. The suspension is stirred at room temperature for 1 h. After the reaction, the solution is extracted by shaking three times with water (150 mL) and the solvent is subsequently removed on a rotary evaporator. In this procedure, a yellow solid is precipitated. The product is washed with water in a filter. The product yield is 29.7679 g (98.1 mmol, 99.8%).

$^1$H NMR (CDCl$_3$, 300 MHz) δ 2.43 (s, 3H), 7.32-7.35 (m, 2H), 7.71-7.81 (m, 4H), 7.87-7.90 (m, 2H).

Compound B: Benzo[1,2-c:4,5-c']dipyrrole-1,3,5,7 (2H,6H)-tetrone, 2,6-bis[[(4-methylphenyl)sulfonyl]oxy]

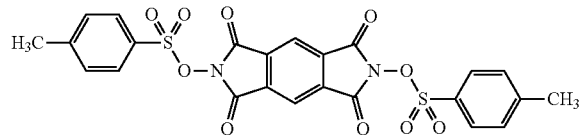

In a baked Schlenk flask, under a nitrogen atmosphere, 5.9096 g of para-toluenesulfonic acid (31.0 mmol) and 3.4453 g of N-dihydroxypyromellitimide (13.9 mmol) are dissolved in dichloromethane (120 mL). The reaction solution is admixed with 11 mL of pyridine. The addition of pyridine is followed by the precipitation of a yellow solid. The suspension is stirred at room temperature for 16 h. The crude product is subsequently washed with dichloromethane and water. The product yield is 5.9507 g (10.7 mmol, 77.0%).
$^1$H NMR (DMSO, 300 MHz) δ 2.47 (s, 6H), 7.52-7.55 (m, 4H), 7.96-7.99 (m, 4H), 8.39 (s, 2H).

Compound C: 4,8-Ethenobenzo[1,2-c:4,5-c']dipyrrole-1,3,5,7(2H,6H)-tetrone, 3a,4,4a,7a,8,8a-hexahydro-2,6-bis[[(4-methylphenyl)sulfonyl]oxy]

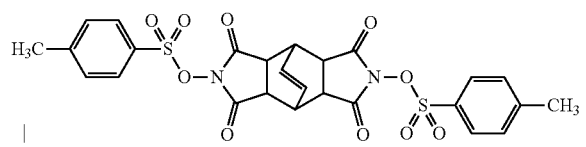

The synthesis is carried out in a baked Schlenk flask under a nitrogen atmosphere. 15.4331 g of para-toluenesulfonic acid (80.9 mmol) and 9.0077 g of bicyclo[2.2.2]oct-7-ene-2,3,5,6-tetracarboxyldiimide (32.4 mmol) are dissolved in dichloromethane (350 mL). The reaction solution is admixed with 15 mL of pyridine. The solution is stirred at room temperature for 17 h, during which a white solid is precipitated. The crude product precipitated is filtered and washed with water. The product yield is 17.860 g (30.44 mmol, 94.0%).
$^1$H NMR (DMSO, 300 MHz) δ 2.47 (s, 6H), 6.22 (s, 2H), 7.53-7.56 (m, 4H), 7.85-7.88 (m, 4H).

Production and Testing of Flame-Retarded Inventive Plastics Compositions

The polypropylene samples (Braskem Inspire 153) are extruded at a temperature of 200° C. and a screw speed of 200 rpm on an 11 mm twin-screw extruder (Process 11 from Thermo Scientific). The desired ratio of polymer to flame retardant is initially homogenized by mixing and supplied to the extrusion via a volumetric feed. After the extrusion, the polymer extrudate is pelletized.

Specimens for fire testing are pressed from the resultant pellets at 200° C. for a total of 3 minutes, applying a pressure of one tonne for 1 minute and a pressure of 2 tonnes for 2 minutes. The specimens as per standard have the following dimensions: 125×13×1.6 mm.

The inventive examples and comparative examples contained in the table were tested according to DIN EN 60695-11-10, giving the following burn times and classification as per standard:

| Examples | Flame retardant composition[a] | Burn times Total of afterburn times of 5 test specimens for 2 exposures to flame [in seconds] | Classification according to DIN EN 60695-11-10 |
|---|---|---|---|
| CB1 | no flame retardant | >100 | n.c. |
| CB2 | 10% phosphazene | >100 | n.c. |
| IB1 | 2% A 5% phosphonate | 0 | V-2 |
| IB2 | 2% A 8% phosphonate | 0 | V-0 |
| IB3 | 2% A 15% phosphonate | 0 | V-0 |
| IB4 | 2% B 8% phosphonate | 4.3 | V-2 |
| IB5 | 2% B 15% phosphonate | 1.9 | V-2 |
| IB6 | 5% B 10% phosphonate | 0 | V-2 |
| IB7 | 2% C 5% phosphonate | 0.9 | V-2 |
| IB8 | 2% C 8% phosphonate | 1.3 | V-2 |
| IB9 | 2% C 15% phosphonate | 0 | V-2 |
| IB10 | 5% C 10% phosphazene | 28.2 | V-2 |

[a]Figures in wt % based on the total amount of flame retardant(s) and polymer;
n.c. = not classified.

The phosphonate is a commercial product available under the name Aflammit PCO 900 from Thor. The phosphazene is a commercial product available under the name SPB-100 from Otsuka Chemicals.

The inventive examples are self-extinguishing after removal of the ignition source and have very short burn times, receiving a V-0 or V-2 classification.

The following compositions were processed, and examined for their flame behavior, in the same way as for examples IB1 to IB10. As a difference, the test specimens were produced by injection molding at a maximum temperature of 210° C.

| Examples | Flame retardant composition[a] | Burn times Total of afterburn times of 5 test specimens for 2 exposures to flame [in seconds] | Classification according to DIN EN 60695-11-10 |
|---|---|---|---|
| CB3 | 15% PSPPP | >100 | n.c. |
| CB4 | 8% Phoslite B 85 | >100 | n.c. |
| CB5 | 15% PX-202 | >100 | n.c. |
| IB11 | 2% A 8% PSPPP | 7.5 | V-2 |
| IB12 | 2% A 8% Phoslite B 85 | 0 | V-0 |
| IB13 | 1.5% A 4% PCO 910 | 0 | V-0 |
| IB14 | 2% A 15% PX-202 | 0 | V-0 |

[a]Figures in wt % based on the total amount of flame retardant(s) and polymer;
PSPPP = Polysulfonyl diphenylene phenylphosphonate
Phoslite B 85 = Aluminum hypophosphite as main component (manufacturer: Italmatch)
PCO 910 = Aflammit PCO 910, phosphonate, commercial product from Thor.
PX-202 = Phosphate ester, commercial product from Daihachi, Osaka, JP.

C) The following compositions were processed in polyethylene (LDPE, LD 185, Exxon Mobil) at a maximum temperature of 190° C. at a speed of 150 rpm, and investigated for their flame behavior, in analogy to examples IB11 to 1B14. The test specimens were produced by injection molding at a maximum temperature of 190° C.

| Examples | Flame retardant composition$^a$ | Burn times Total of afterburn times of 5 test specimens for 2 exposures to flame [in seconds] | Classification according to DIN EN 60695-11-10 |
|---|---|---|---|
| C1 | 2% A 5% PCO 910 | 0 | V-0 |
| C2 | 2% A 8% PCO 910 | 0 | V-0 |

D) Instead of test specimens, films of polypropylene were produced by compression molding from the extruded pellets, at temperatures reported in the table, in analogy to examples IB1 to IB10. The resulting films were tested according to the DIN 4102 B2 standard, and additionally the fire time and fire height were determined.

| Examples | Flame retardant composition$^a$ | Processing temperature [° C.] | Film thickness [mm] | DIN 4102 B2 | Burn times [in seconds] | Fire height [mm] |
|---|---|---|---|---|---|---|
| CD1 | No addition | 190 | 0.20 | Fail | Complete combustion | Complete combustion |
| ID1 | 0.5% A | 190 | 0.23 | Pass | | 43 |
| ID2 | 0.5% A | 220 | 0.18 | Pass | 0 | 43 |
| ID3 | 0.5% A | 250 | 0.27 | Pass | 0 | 52 |
| ID4 | 1.0 A | 220 | 0.27 | Pass | 0 | 45 |

The polymer films comprising the inventive compounds meet the B 4102 B2 standard, in contrast to the comparative example.

E) Instead of test specimens, films of LD-polyethylene were produced by compression molding from the extruded pellets, at 190° C., in analogy to examples IE1 to IE10. The resulting films were tested according to the DIN 4102 B2 standard, and additionally the fire time and fire height were determined.

| Examples | Flame retardant composition$^a$ | Film thickness [mm] | DIN 4102 B2 | Burn times [in seconds] | Fire height [mm] |
|---|---|---|---|---|---|
| CE1 | No addition | 0.35 | Fail | Complete combustion | Complete combustion |
| IE1 | 2% A 5% PCO 910 | 0.36 | Pass | 0 | 47 |
| IE2 | 2% A 8% PCO 910 | 0.36 | Pass | 0 | 39 |

The polymer films comprising the inventive compounds meet the B 4102 B2 standard, in contrast to the comparative example.

The invention claimed is:

1. A method of imparting flame retardancy to a plastic such that the resulting flame retarded plastic has a flame retardancy rating of V-2 or better according to UL-94, the method comprising incorporating into the plastic at least one halogen-free sulfonic ester and/or at least one halogen-free sulfinic ester as a flame retardant and/or a flame retardant synergist, wherein the at least one halogen-free sulfonic ester or the at least one halogen-free sulfinic ester is a halogen-free sulfonic acid azanyl ester of the general formula (Ia) and/or halogen-free sulfinic acid azanyl ester of the general formula (Ib);

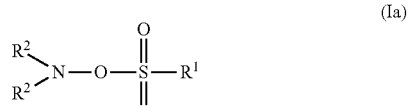
(Ia)

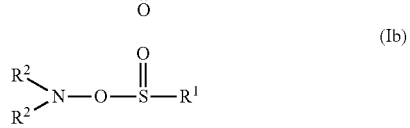
(Ib)

wherein radicals $R^1$ and $R^2$ are independently selected from the group consisting of substituted or unsubstituted alkyl groups, heteroalkyl groups, cycloalkyl groups, heterocycloalkyl groups, acyl groups, aryl groups and heteroaryl groups, where two radicals $R^2$ can form a cyclic system;
wherein the plastic is a polymer of olefin or diolefin; and
wherein the at least one halogen-free sulfonic ester and/or halogen-free sulfinic ester is incorporated further in combination with a further flame retardant compound which is a phosphorus-containing flame retardant;
wherein, in the resulting flame retarded plastic, the plastic is present in an amount of 60 to 90 wt. %, the halogen-free sulfonic ester and/or halogen-free sulfinic ester is present in an amount of 2 to 5 wt. %, and the further flame retardant is present in an amount of 5 to 15 wt. %.

2. The method of claim 1, wherein the halogen-free sulfonic ester is a sulfonic acid azanyl ester selected from the group consisting of compounds having the following formulae, or mixtures thereof:

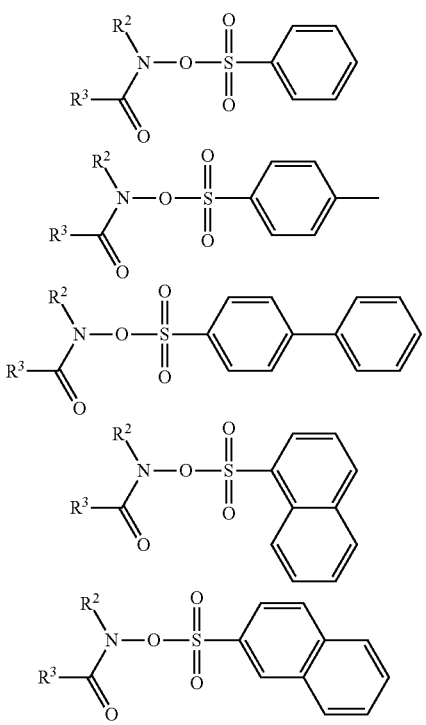

-continued

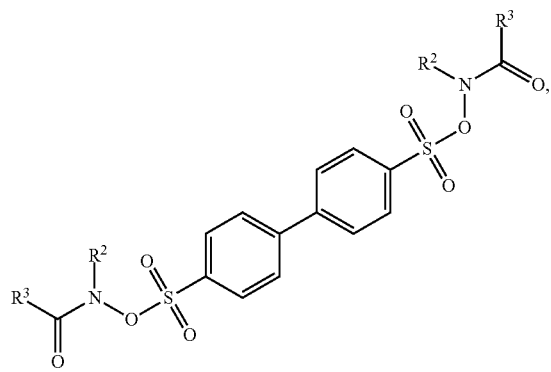

where R² has the same definition as indicated above; and

R³ is selected from the group consisting of substituted or unsubstituted alkyl groups, heteroalkyl groups, cycloalkyl groups, and heterocycloalkyl groups;

where R² and R³ can form a cyclic system; and where the aromatic structural units can be substituted; where alkyl groups are as substituents.

3. The method of claim 2, wherein the halogen-free sulfonic ester is a sulfonic acid azanyl ester having the formula indicated below:

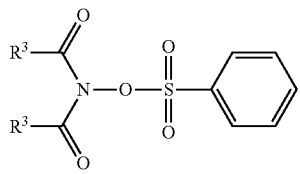

where R³ is selected from the group consisting of substituted or unsubstituted alkyl groups, heteroalkyl groups, cycloalkyl groups, heterocycloalkyl groups and a cyclic system formed from two radicals R³.

4. The method of claim 1, wherein the halogen-free sulfonic ester is a sulfonic acid azanyl ester in oligomeric or polymeric form, prepared by polymerization or polymer-analogous reaction from monomers selected from the group consisting of one of the compounds having the formulae below, or mixtures thereof:

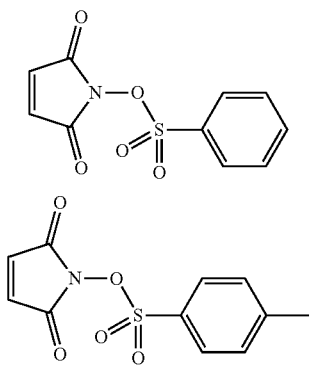

-continued

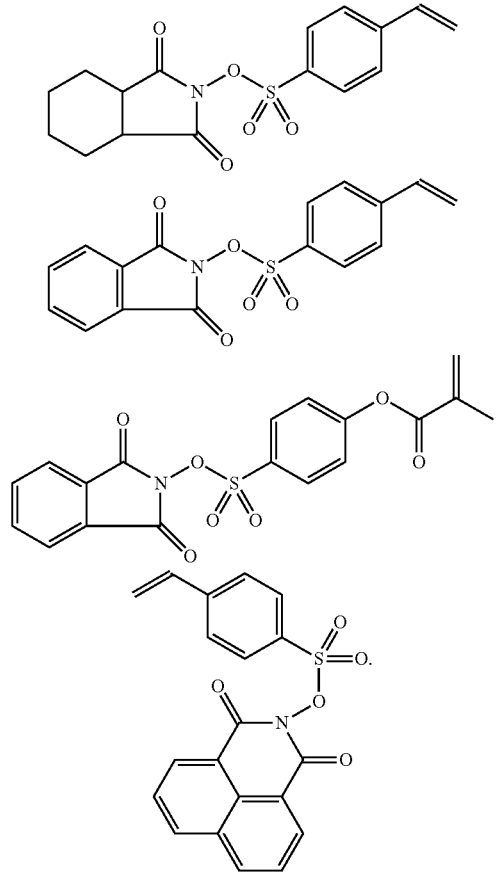

5. The method of claim 1, wherein the at least one halogen-free sulfonic ester and/or halogen-free sulfinic ester and the further flame retardant compound are incorporated further in combination with an additional compound selected from (v) radical initiators;

(vi) borates;

(vii) sulfur-containing compounds;

(viii) anti-drip agents;

(ix) silicon-containing compounds;

(x) salts of sulfonic acids;

(xi) smoke suppressants;

(xii) carbon compounds; and (xiii) mixtures, combinations or blends of two or more of the additional compounds stated under (v) to (xii).

6. A flame-retarded plastic composition comprising components (A) to (D), wherein:

(A) 60 to 90 wt % of a polymer of olefin or diolefin;

(B) 2 to 5 wt % of at least one flame retardant comprising at least one halogen-free sulfonic ester and/or at least one halogen-free sulfinic ester, and mixtures thereof;

wherein the at least one halogen-free sulfonic ester or the at least one halogen-free sulfinic ester is a halogen-free sulfonic acid azanyl ester of the general formula (Ia) and/or halogen-free sulfinic acid azanyl ester of the general formula (Ib);

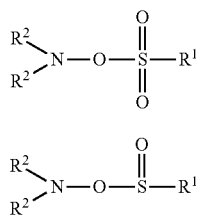

(Ia)

(Ib)

wherein radicals R¹ and R² are independently selected from the group consisting of substituted or unsubstituted alkyl groups, heteroalkyl groups, cycloalkyl groups, heterocycloalkyl groups, acyl groups, aryl groups and heteroaryl groups, where two radicals R² can form a cyclic system;

(C) 5 to 15 wt % of at least one non-(B) flame retardant or flame retardant synergist, and mixtures thereof; wherein the at least one non-(B) flame retardant or flame retardant synergist is a phosphorus-containing flame retardant; and (D) 0 to 50 wt % of at least one additive or adjuvant;

wherein the weight fractions of components (A) to (D) add up to 100 wt %; and wherein the flame retarded plastic composition has a flame retardancy rating of V-2 or better according to UL-94.

7. The flame-retarded plastic composition of claim 6, which further includes a compound selected from the group consisting of
(v) radical initiators;
(vi) halogen-containing flame retardants based on chlorine and bromine,;
(vii) borates;
(viii) sulfur-containing compounds;
(ix) anti-drip agents;
(x) silicon-containing compounds;
(xi) salts of sulfonic acids;
(xii) smoke suppressants;
(xiii) carbon compounds; and
(xiv) mixtures, combinations or blends of two or more of the substances stated under (v) to (xiii).

8. The flame-retarded plastic composition of claim 6, which is free from antimony compounds.

9. The flame-retarded plastic composition of claim 6, wherein component (D) is selected from the group consisting of UV absorbers, light stabilizers, UV stabilizers, and mixtures thereof;

acid scavengers are selected from the group consisting of salts of long-chain carboxylic acids, calcium stearate, magnesium stearate, zinc stearate, calcium lactate, calcium stearoyl-2-lactylate, and hydrotalcites;

light stabilizers and UV stabilizers are selected from the group consisting of phenolic antioxidants, phosphites, phosphonites, sterically hindered amines (HALS), and mixtures thereof;

phenolic antioxidants are selected from the group consisting of octadecyl 3-(3,5-di-tert-butyl-4-hydroxyphenyl)propionate, pentaerythritol tetrakis[3-(3,5-di-tert-butyl-4-hydroxyphenyl)propionate, tris(3,5-di-tert-butyl-4-hydroxyphenyl) isocyanurate, 1,3,5-trimethyl-2,4,6-tris(3,5-di-tert-butyl-4-hydroxyphenyl) isocyanurate, 1,3,5-trimethyl-2,4,6-tris(3,5-di-tert-butyl-4-hydroxybenzyl)benzene, triethylene glycol bis [3-(3-tert-butyl-4-hydroxy-5-methylphenyl)propionate, N,N'-hexane-1,6-diylbis[3-(3,5-di-tert-butyl-4-hydroxyphenyl)propionamide, and mixtures thereof;

phosphites and phosphonites are selected from the group consisting of tris(2,4-di-tert-butylphenyl) phosphite, diisodecyl pentaerythritol diphosphite, bis(2,4-di-tert-butylphenyl) pentaerythritol diphosphite, bis(2,4-di-cumylphenyl) pentaerythritol diphosphite, bis(2,6-di-tert-butyl-4-methylphenyl) pentaerythritol diphosphite, diisodecyloxypentaerythritol diphosphite, bis(2,4-di-tert-butyl-6-methylphenyl) pentaerythritol diphosphite, bis(2,4,6-tris(tert-butylphenyl) pentaerythritol diphosphite, tetrakis(2,4-di-tert-butylphenyl)-4,4'- biphenylenediphosphonite, and mixtures thereof;

aminic antioxidants are selected from the group consisting of N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3- methylpentyl)-p-phenylenediamine, N,N'-bis(1-methylheptyl)-p-phenylenediamine, N,N'-dicyclohexyl-p-phenylenediamine, N,N'-diphenyl -p-phenylenediamine, N,N'-bis(2-naphthyl)-p-phenylenediamine, N-isopropyl-N'-phenyl-p -phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, and mixtures thereof;

sulfur-containing antioxidants are selected from the group consisting of distearyl thiodipropionate, dilauryl dipropionate, and mixtures thereof;

hydroxylamines are selected from the group consisting of N,N-dialkylhydroxylamine, N,N-dibenzylhydroxylamine, N,N-dilaurylhydroxylamine, N,N-distearylhydroxylamine, N-benzyl a-phenyl nitrone, N-octadecyl α-hexadecyl nitrone; and/or sterically hindered amines are selected from the group consisting of 1,1-bis(2,2,6,6-tetramethyl-4-piperidyl) succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensation product of 1-(2-hydroxyethyl)-2,2,6, 6-tetramethyl-4-hydroxypiperidine and succinic acid, linear or cyclic condensation products of N,N'-bis(2,2, 6,6-tetramethyl-4-piperidyl)hexamethylendiamine and 4-tert-octylamino-2,6-di-chloro-1,3,5-triazine, tris(2,2, 6,6-tetramethyl-4-piperidyl) nitrilotriacetate, tetrakis (2,2,6,6-tetra-methyl-4-piperidyl) 1,2,3,4-butanetetracarboxylate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, linear or cyclic condensation products of N,N'-bis(2,2,6,6-tetramethyl-4-piperidyl) hexamethylendiamine and 4-morpholino-2,6-dichloro-1,3,5-triazine, the reaction product of 7,7,9,9-tetramethyl-2-cycloundecyl-1-oxa-3,8-diaza-4-oxospiro[4.5] decane and epichlorohydrin, and mixtures thereof.

10. The flame-retarded plastic composition of claim 6, wherein component (A) is present at 60 to 90 wt % based on the total weight of the flame-retarded plastic composition;
component (B) is present at 2 to 5 wt % based on the total weight of the flame-retarded plastic composition;
component (C) is present at 5 to 15 wt % based on the total weight of the flame-retarded plastic composition; and
component (D) is present at 0.05 to 30 wt % based on the total weight of the flame-retarded plastic composition.

11. The flame-retarded plastic composition of claim 6, wherein the flame retarded plastic is a flame retarded polymer of olefin or diolefin utilized in electrical or electronics industry, mechanical engineering, apparatus construction, building industry, transport industry, medical application, household appliance, vehicle part, cable, consumer good, packaging, furniture, or textile.

12. The method of claim 1, wherein the halogen-free sulfonic acid azanyl ester and/or halogen-free sulfinic acid azanyl ester act as radical generators when modifying plastic.

13. The method of claim 1, wherein the halogen-free sulfonic ester is a sulfonic acid azanyl ester and is selected from the group consisting of the compounds having the following formulae and mixtures thereof:

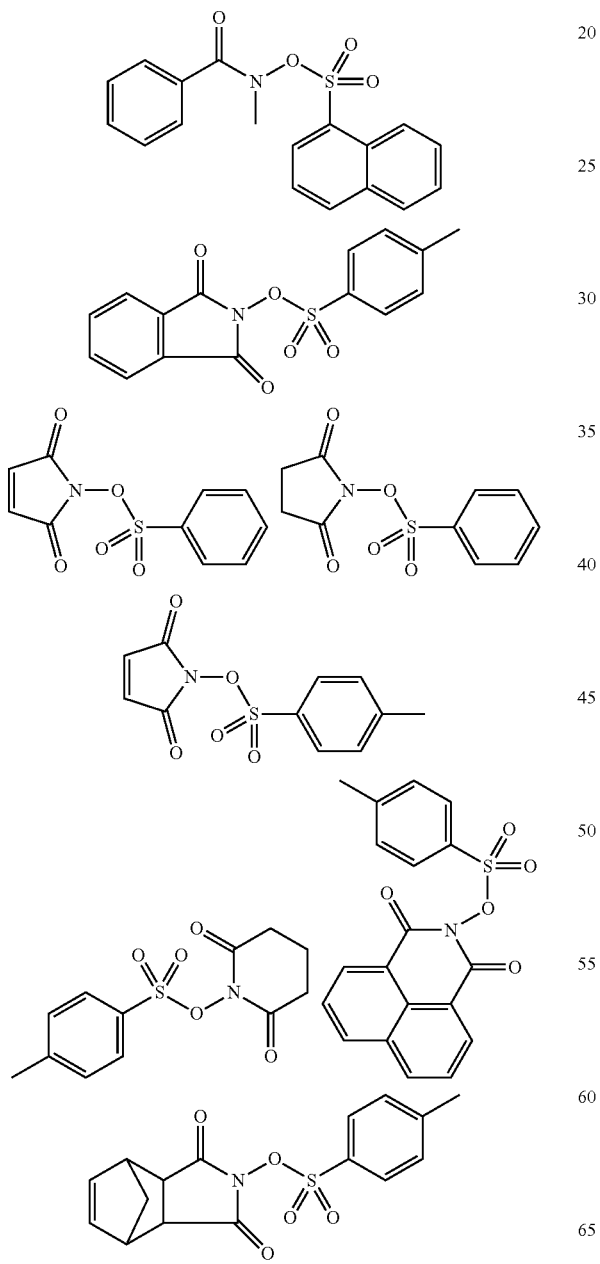

-continued

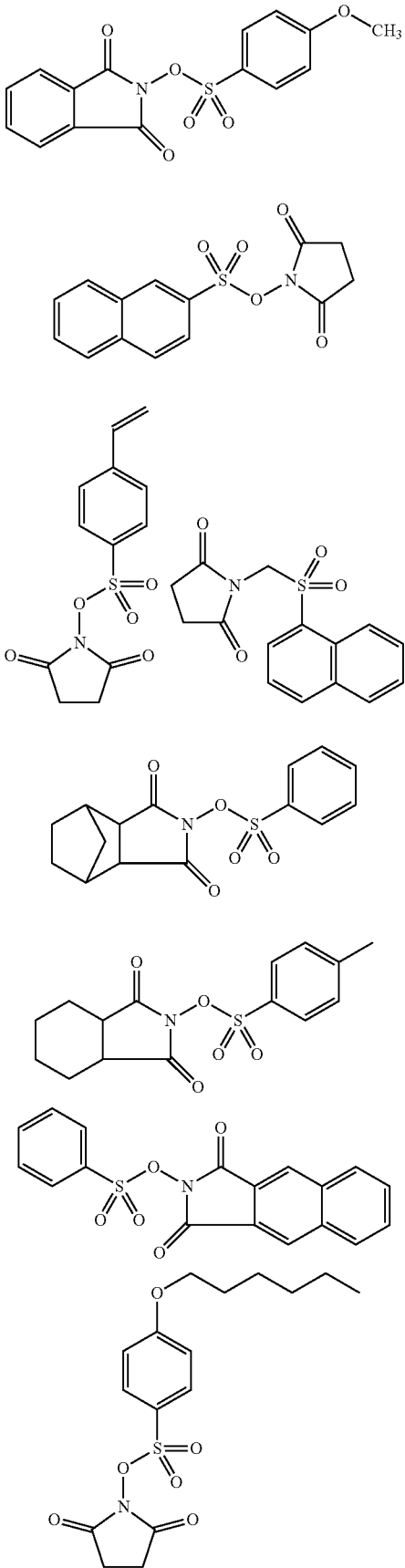

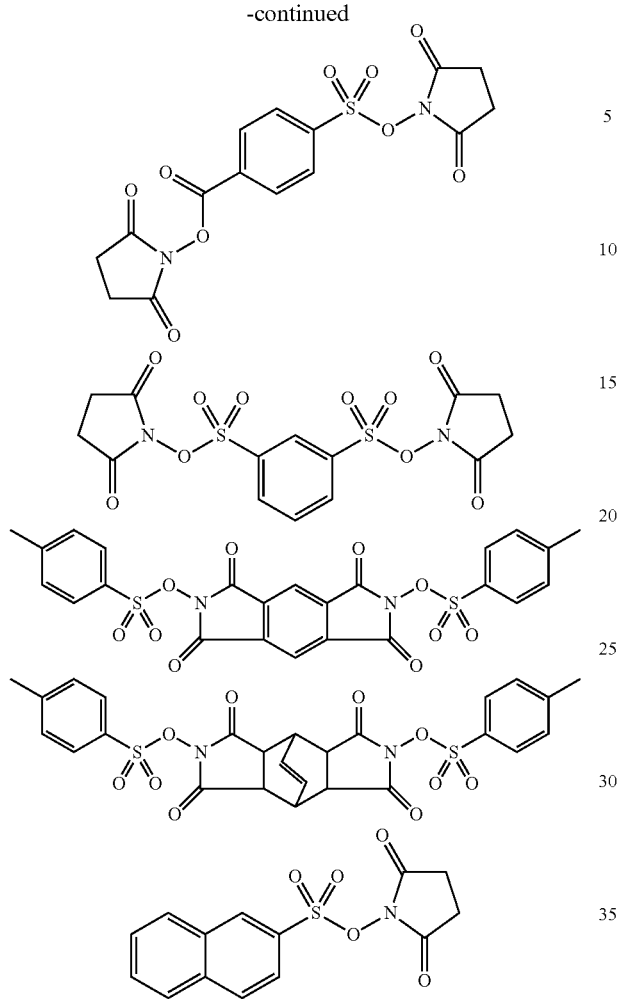
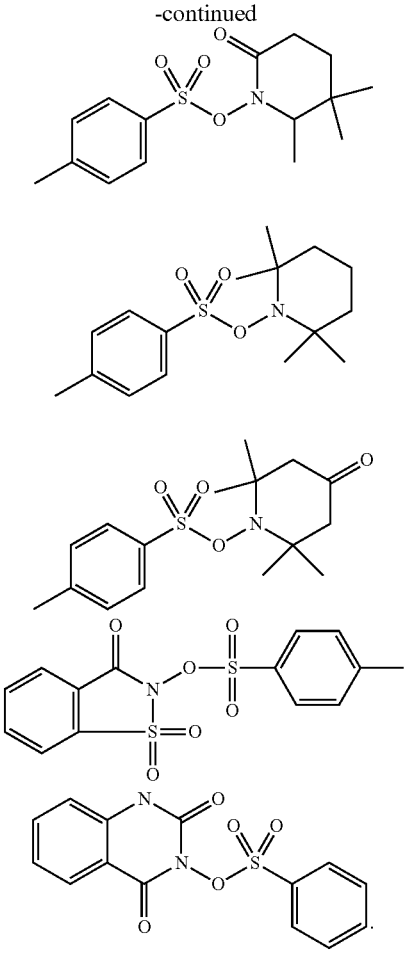
* * * * *